United States Patent

[11] 3,617,016

[72] Inventor Emil J. Bolsey
 160 Concord Ave., White Plains, N.Y. 10606
[21] Appl. No. 778,870
[22] Filed May 27, 1968
[45] Patented Nov. 2, 1971
 Continuation-in-part of application Ser. No. 118,194, June 19, 1961, now abandoned.

[54] IMAGE MOTION AND CHANGE TRANSDUCERS AND SYSTEMS CONTROLLED THEREBY
 24 Claims, 24 Drawing Figs.
[52] U.S. Cl. .................................................. 244/3.16, 95/12.5, 89/41 L
[51] Int. Cl. ..................................................... F41g 9/00, F42b 15/02, F41g 11/00
[50] Field of Search ........................................... 244/3.16; 95/12.5

[56] References Cited
UNITED STATES PATENTS

| | | | |
|---|---|---|---|
| 2,972,928 | 2/1961 | Maurer | 95/12.5 X |
| 2,967,470 | 1/1961 | Willits et al. | 95/12.5 |
| 2,922,100 | 1/1960 | Ketchledge | 244/14 UX |
| 2,899,882 | 8/1959 | Wilie et al. | 95/12.5 |
| 3,065,931 | 11/1962 | Dixon et al. | 244/14 |
| 3,120,360 | 2/1964 | Wylie et al. | 244/14 |
| 2,070,178 | 2/1937 | Pettenger et al. | 244/14.3 |
| 2,420,509 | 5/1947 | Whittaker | 244/14.3 |
| 2,713,134 | 7/1955 | Eckweiler | 244/14.3 |
| 2,826,378 | 3/1958 | Childs | 244/14 |
| 2,931,910 | 4/1960 | Ostergren et al. | 244/14.3 |
| 3,093,821 | 6/1963 | Alpers et al. | 244/14.3 |
| 2,849,184 | 8/1958 | Fredrick et al. | 343/7 |
| 2,853,700 | 9/1958 | Cherry, Jr. | 244/14 |
| 2,961,190 | 11/1960 | Miller et al. | 244/14 |
| 2,963,543 | 12/1960 | Link et al. | 114/20 |
| 2,972,276 | 2/1961 | Whitney | 250/233 |
| 3,080,485 | 3/1963 | Saxton | 250/203 |
| 3,138,712 | 6/1964 | Aroyan | 250/203 |
| 3,139,246 | 6/1964 | Willits | 244/14 |

OTHER REFERENCES
Klass, "Optical Guidance Designed for Missiles," Aviation Week, Dec. 8, 1958, pp. 67, 69, 71

Primary Examiner—Benjamin A. Borchelt
Assistant Examiner—Thomas H. Webb
Attorney—Amster and Rothstein ABSTRACT: A system for generating signals indicative of changes in multiple scanned images. The same subject may be scanned at successive intervals or multiple subjects may be scanned simultaneously. In the former situation, signals representative of the scanned image are stored and then compared with signals from a subsequent scanning. Where simultaneous scanning of subjects occurs, signal comparison is immediate. In both cases, output signals are generated in response to changes in the scanned images, the signals being used for positional correction or data readout.

GUIDANCE SYSTEM IN AIRCRAFT SIGHT

SCANNING AND CONTROL COMPONENTS

INVENTOR.
EMIL J. BOLSEY

HIGH VOLTAGE CONTROL

INVENTOR.
EMIL J. BOLSEY

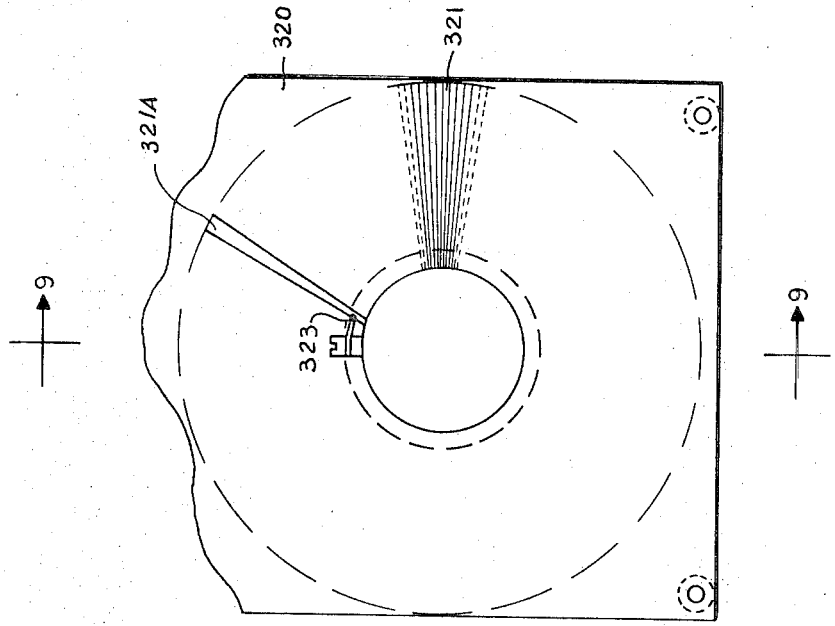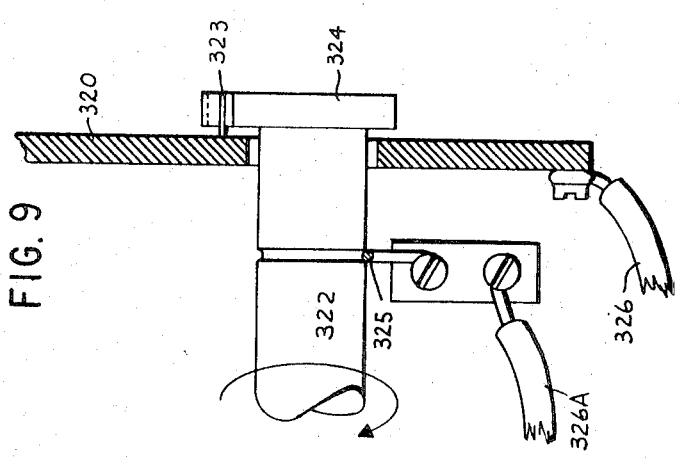

INVENTOR.
EMIL J. BOLSEY
BY Amster & Rothstein
ATTORNEYS

INVENTOR.
EMIL J. BOLSEY

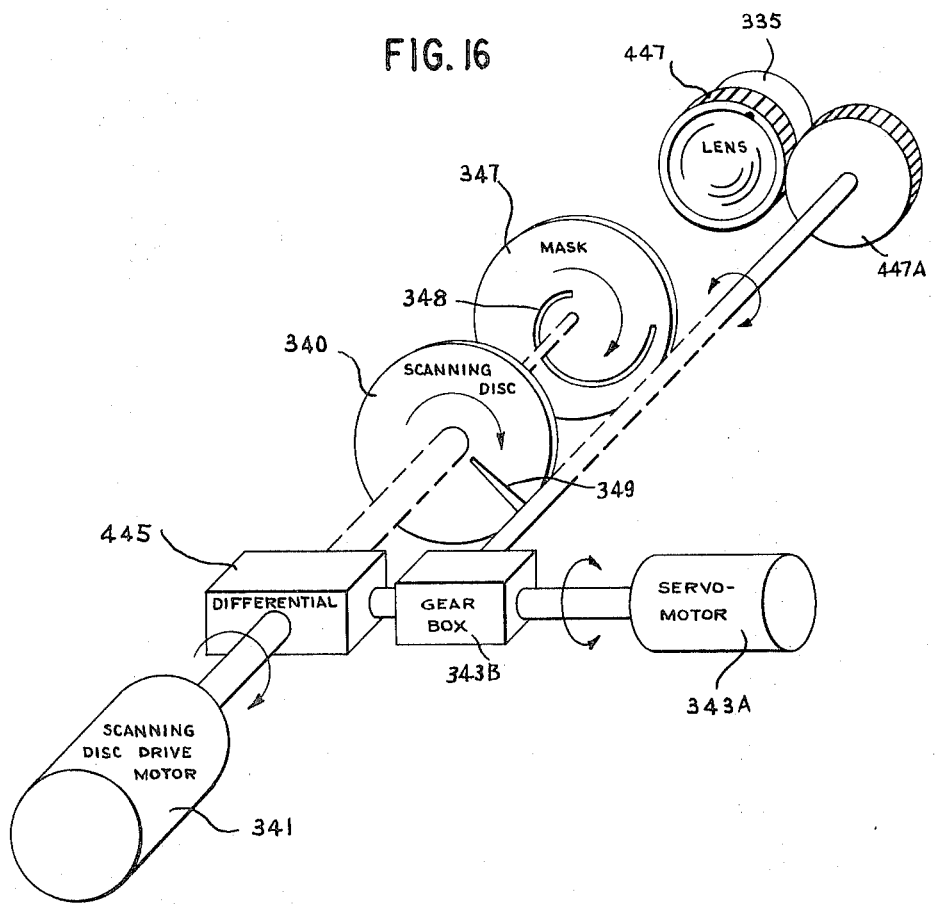

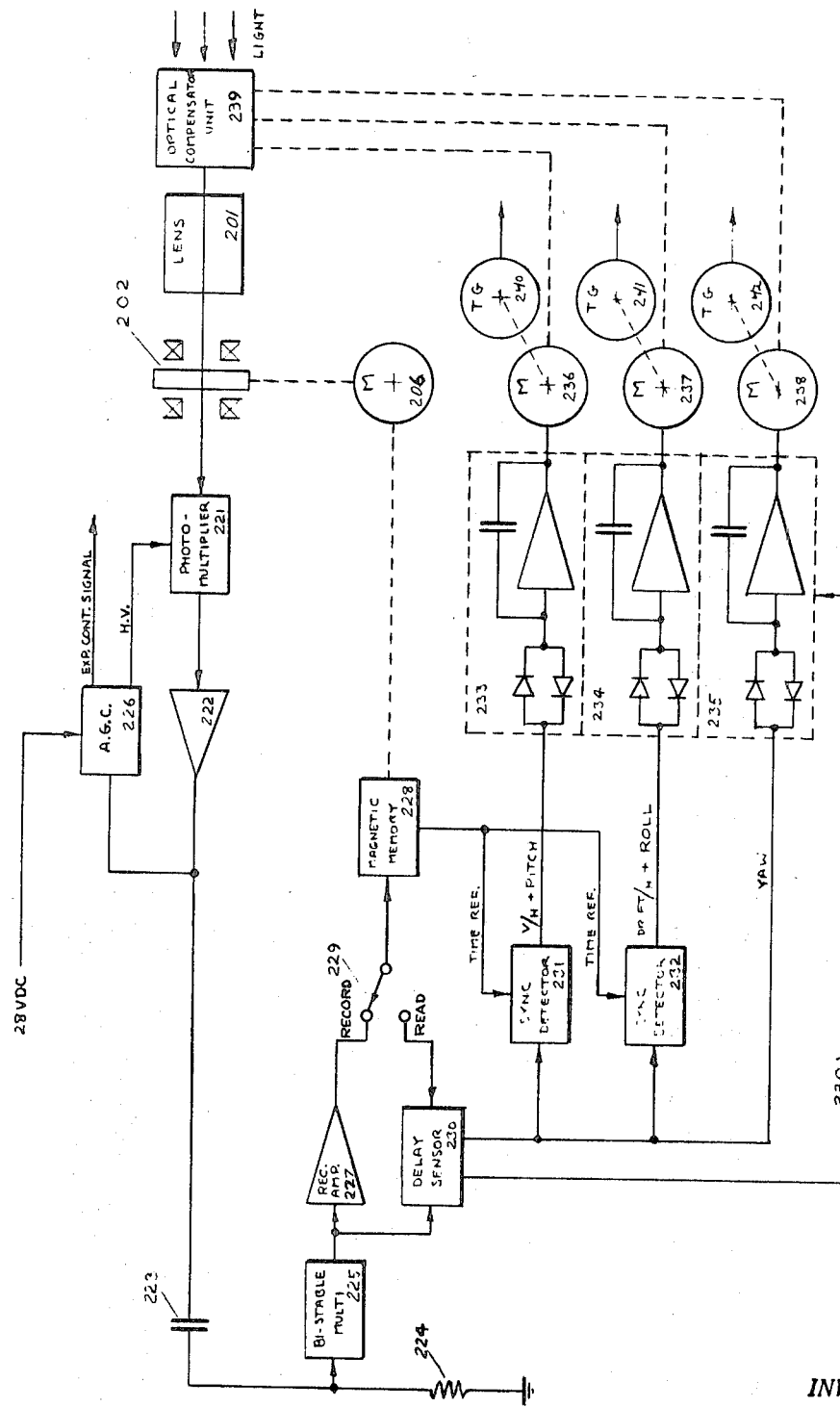

IMAGE MOTION AND CHANGE TRANSDUCERS AND SYSTEMS CONTROLLED THEREBY

This application is a continuation-in-part of Application Ser. No. 118,194, filed June 19, 1961 and now abandoned.

The present invention relates to automatic devices for comparing spatial and temporal energy patterns received from one or more energy radiating or reflecting bodies. By detecting and measuring specific changes in said patterns, such as may, for example, result from relative displacements, the devices of the invention produce output signals indicative of the kind and magnitude of said changes. The output signals may control servos, which may then counteract said changes, or they may simply be readout by suitable instruments, depending on intended application.

While systems of this type have been available heretofore, such previously known devices usually require relatively its method complex, bulky and expensive electronic computers. Moreover, the prior art systems only operate accurately and reliably with certain particular energy patterns and so are limited in application. Generally, the known systems are excessively slow, or they respond only to time-rate of change, thus exhibiting positional drift. Finally, the prior art usually calls for an active system, leading to the generation of undesirable radiative energy.

It is, accordingly, one of the objects of the present invention to provide devices which are inherently free of one or more of the aforesaid difficulties and are therefore suitable for a multiplicity of uses.

It is a further object of the present invention to provide devices which generate specific electrical signals in response to changes occurring in energy patterns, such as optically produced images.

In one particular illustrative embodiment of the invention, a system is disclosed for automatically providing accurate image motion compensation in conjunction with a photographic camera carried by a moving vehicle. In this application, the invention controls the compensatory motions of the camera, or of component parts thereof, to greatly reduce or even eliminate during exposure the relative displacements which tend to occur between the film and the image of a selected part of the subject because of the motions of the vehicle, as is required for the obtention of pictures that are free of motion blur. The device of the invention achieves this automatically by comparing the images produced by the subject in the film plane of the camera at several successive times and by sending appropriate control signals to a conventional servo drive, which may, for example, translate the film along with the image during exposure to essentially eliminate their relative blur-producing motion. In alternate embodiments, the servo drive may either translate internal mirrors or the objective lens, or it may rotate external mirrors, or the whole camera about a pivot in order to effect image motion compensation.

In other applications of the present invention, automatic image comparison may be achieved, which may or may not necessarily be of simultaneously existing images; this can be used to identify those images that are of the same subject, or to check differences between them, such as changes in alignment, in orientation, in size or in other characteristics of the images. In one illustrative application of the invention, such comparison permits accurate aiming, or bore-sighting, of several optical systems to the same target. The invention can also be applied to the accurate navigation of an aircraft, wherein images of the terrain obtained in flight are automatically matched against previously obtained pictures of portions of the desired ground path to provide very accurate "fixes" of the aircraft position at various times during its flight.

It is an object of the present invention to provide a device which can maintain itself, in a fully automatic manner, aimed at a selected target, irrespective of the relative movement between the device and the target.

An additional object of the present invention is to provide an arrangement where a device can properly orient itself with respect to a selected target, or vice versa, irrespective of inaccuracies of the mounting structure which carries the device.

Still another object of the present invention is to provide an arrangement where a device can be directed toward a target either on the basis of information obtained at the instant of aiming by a human operator or on the basis of previously obtained and recorded information.

Also it is an object of the invention to provide a device which is capable of operating initially with respect to one reference and which is capable of automatically providing a second reference with respect to which it operates when the first reference no longer provides accurate operation.

An additional object of the present invention is to provide a system wherein a considerable amount of mismatching in size, between two patterns will have little influence, the system of the invention operating accurately even with an incoming signal that does not correspond fully with a certain reference signal.

Many other uses of the present invention will present themselves to those versed in the art, who will also recognize readily that the devices of the invention can be adapted to operate, for example, with infrared or ultraviolet energy, with radio waves, or even with sonic waves, without departing from the spirit of the invention.

It is therefore a feature of an embodiment of the invention that scanning means adapted to the type of waves to be used, including at least one aperture, scan at least two related energy patterns and convert spatial changes of energy flux density within said patterns to temporal changes of flux entering said aperture.

It is a further feature of an embodiment of this invention that means are included to detect energy flux, together with amplifying, filtering and switching means to produce at least two signals corresponding to the energy patterns, said means further comparing said signals to produce (a) a first series of pulses having positive polarity whenever the first of said signals changes polarity prior to the second and negative polarity whenever the second of said signals changes polarity prior to the first, and (b) a second series of pulses of fixed polarity whenever said signals differ.

It is still another feature of an embodiment of this invention that generating means produces at least one timing signal varying in relation to a corresponding velocity component of a scanning aperture.

It is yet another feature of an embodiment of this invention that synchronous detection means combine a first series of pulses with a timing signal to produce at least another series of pulses characteristically related to positional differences in image-responsive energy patterns occurring in the direction of a velocity component of motion.

The novel features which are considered characteristic of the invention are set forth in the appended claims. The invention itself, its construction and its method of operation, will be best understood from the following detailed description, given by way of examples only, of specific embodiments in connection with accompanying drawings in which:

FIG. 1 diagrammatically illustrates one possible guidance system according to the present invention;

FIG. 2 diagrammatically illustrates an aiming and tracking arrangement which cooperates with that of FIG. 1;

Figure 7:
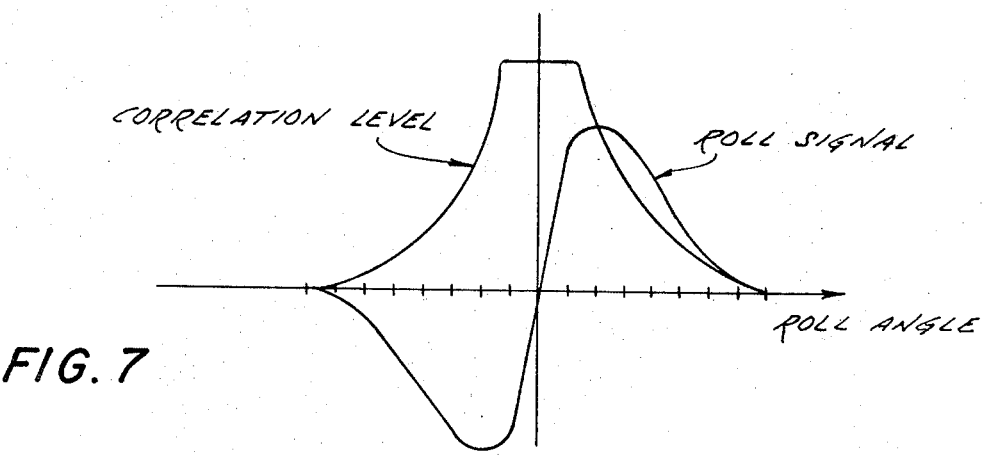
Figure 11:
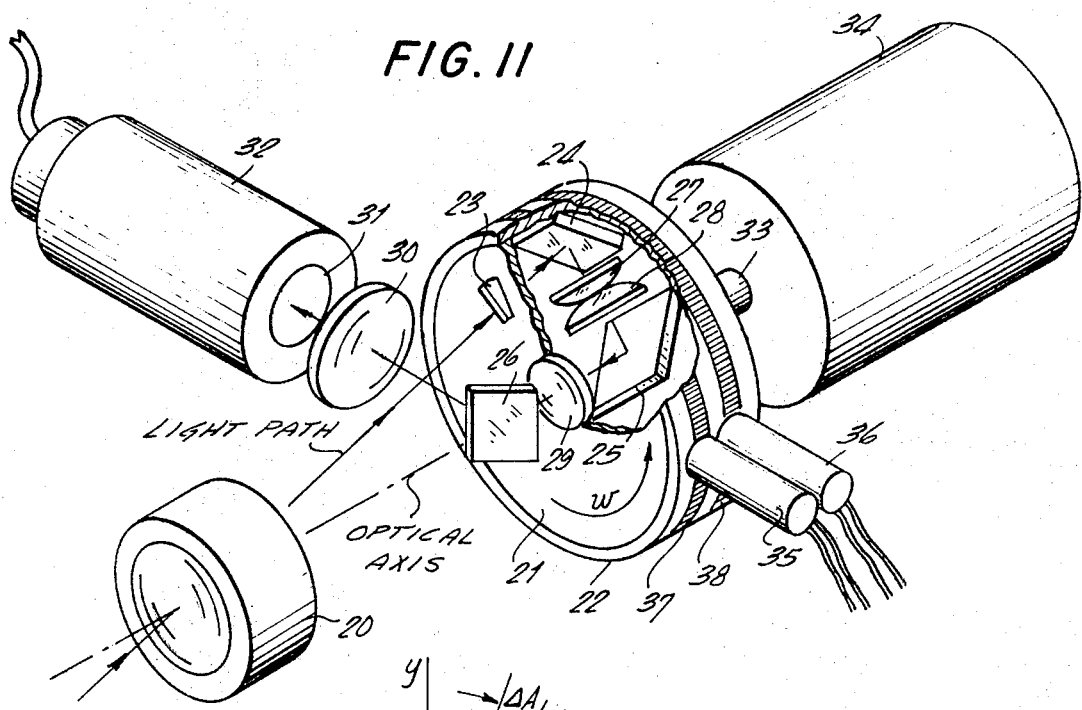
Figure 12:
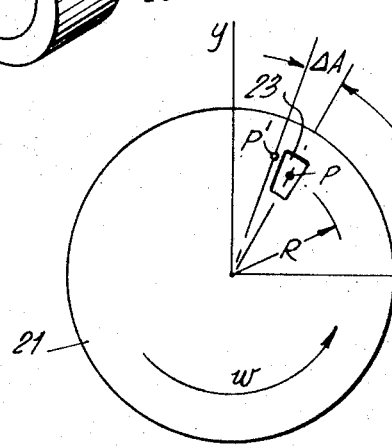
Figure 10:
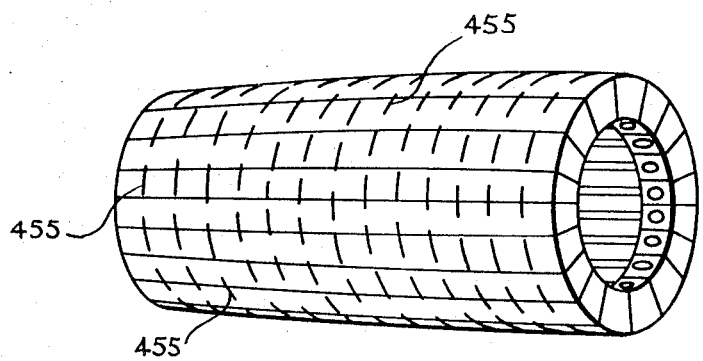
Figure 13:
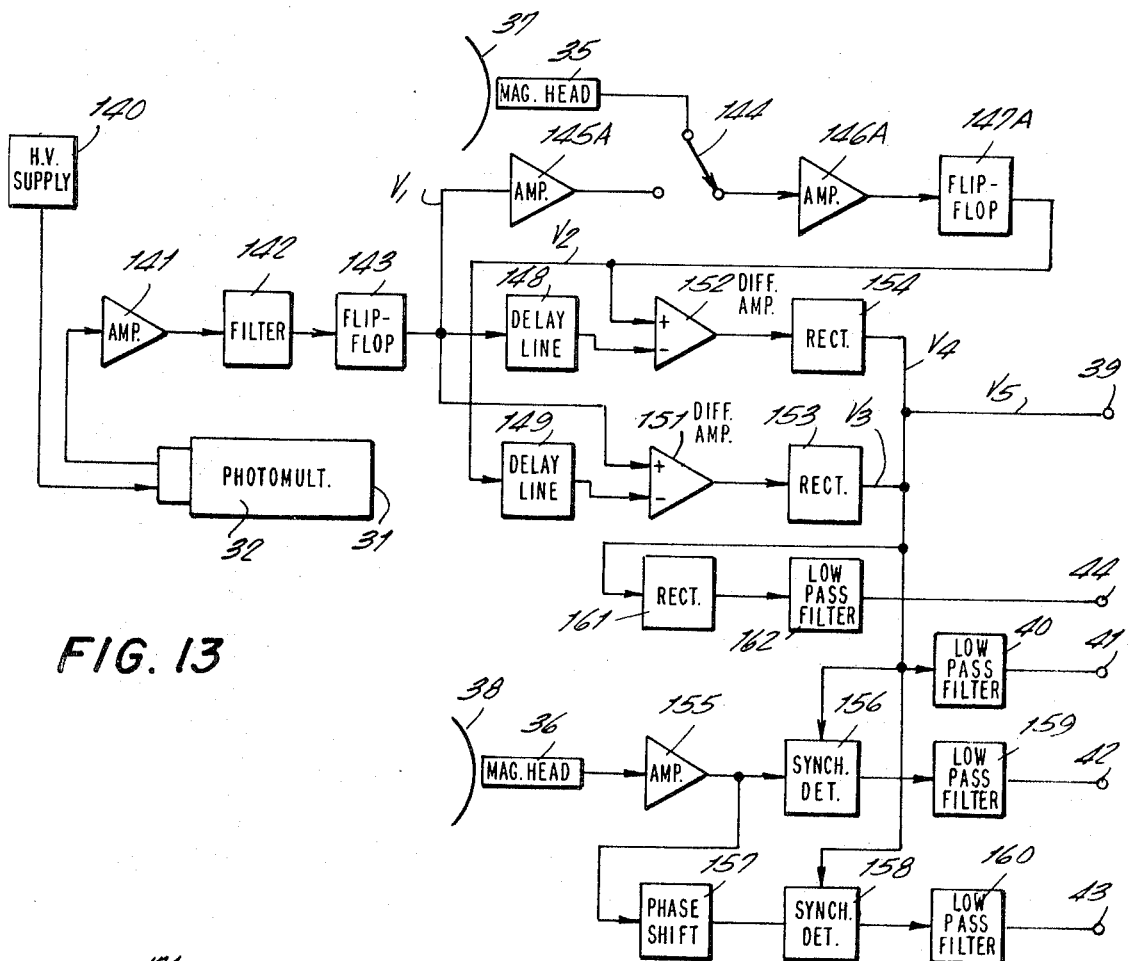
Figure 17:
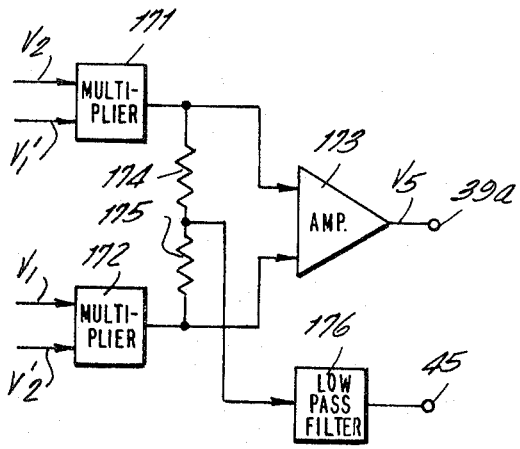
Figure 18:
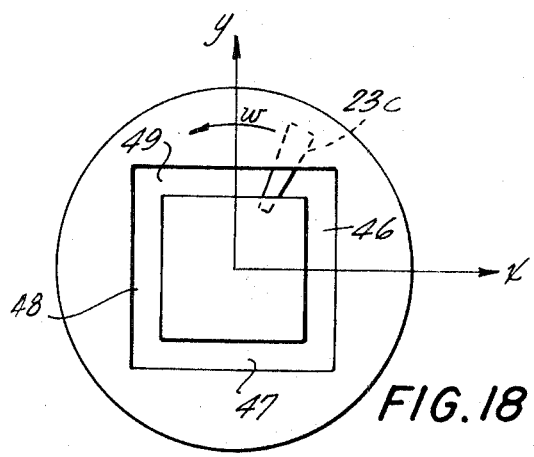
Figure 14:
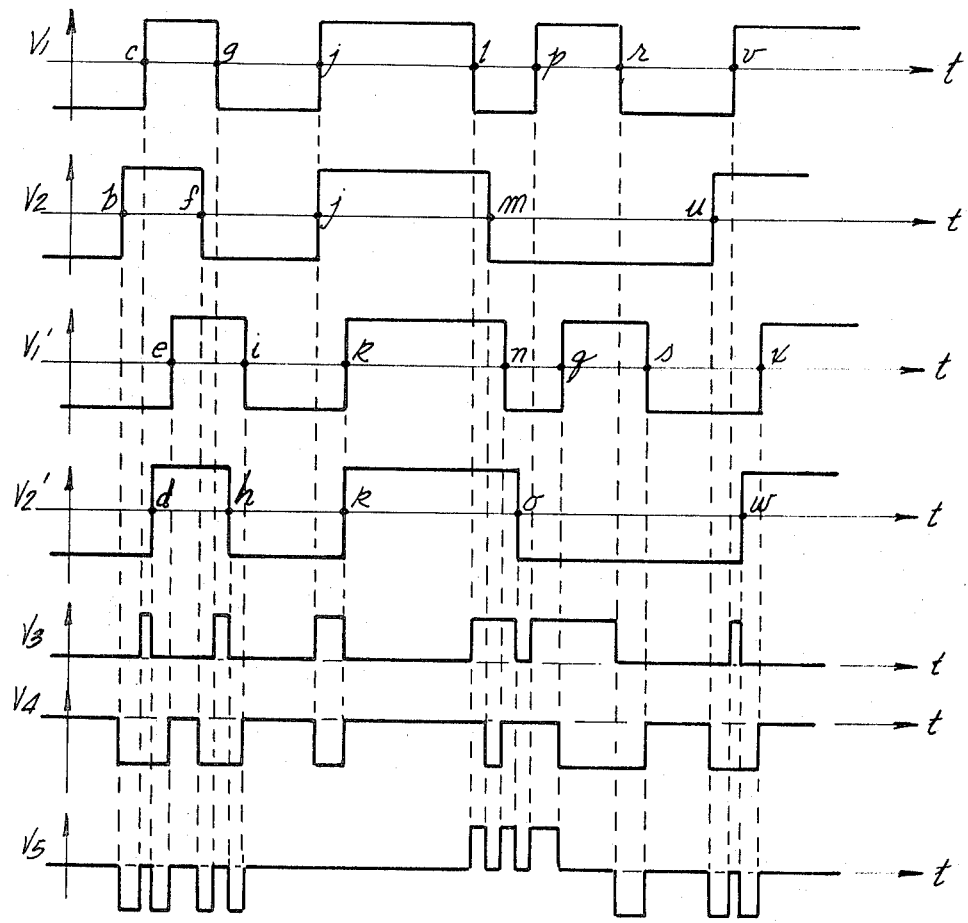
Figure 24:
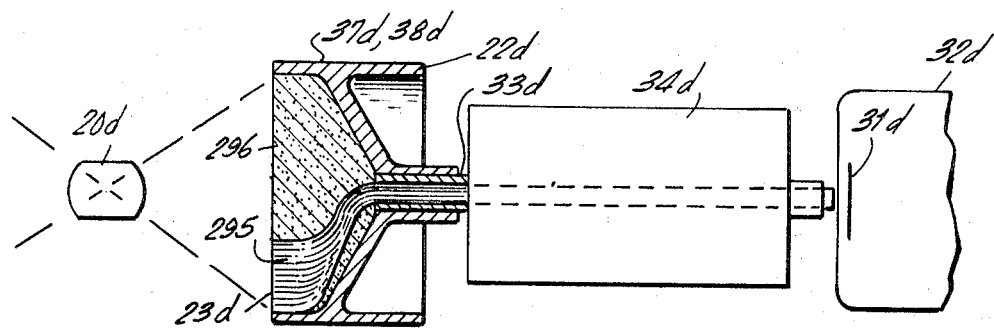
Figure 15:
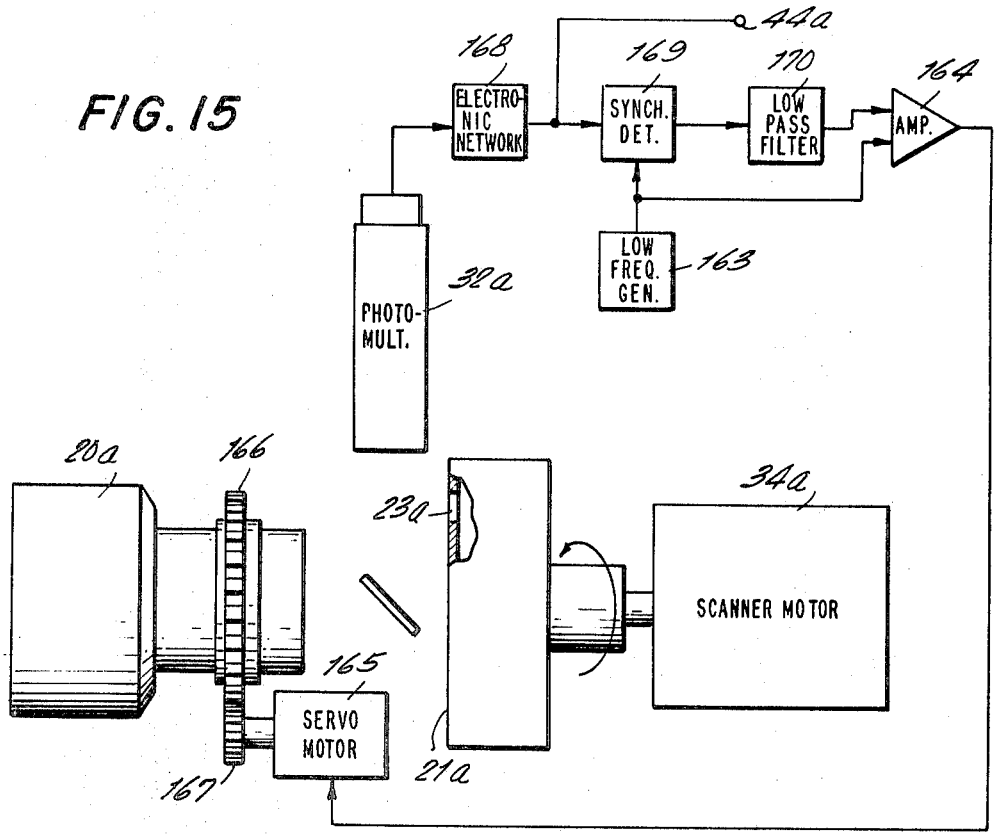
Figure 23:
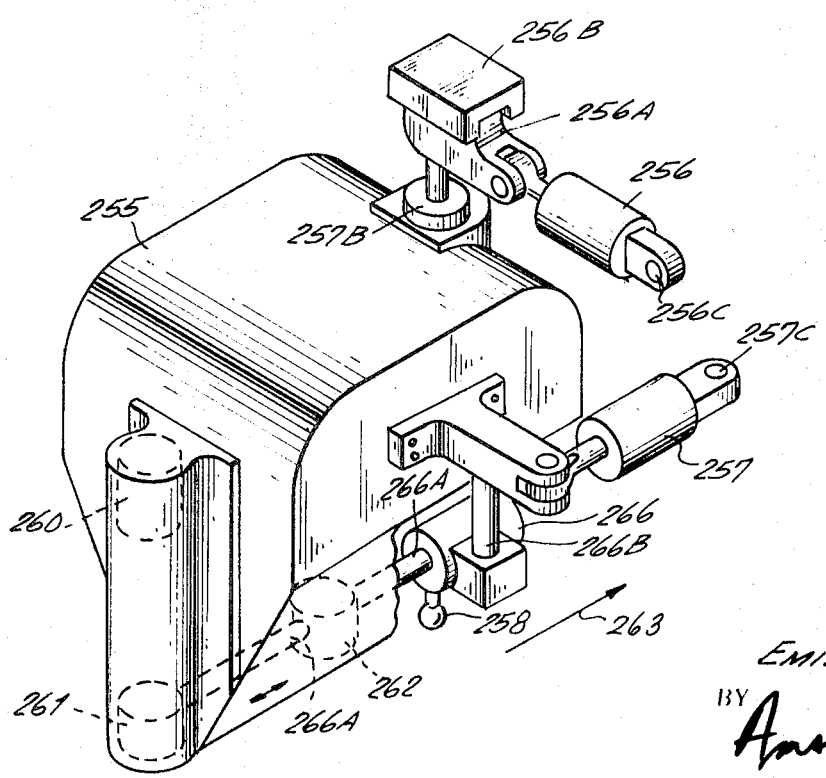
Figure 19:
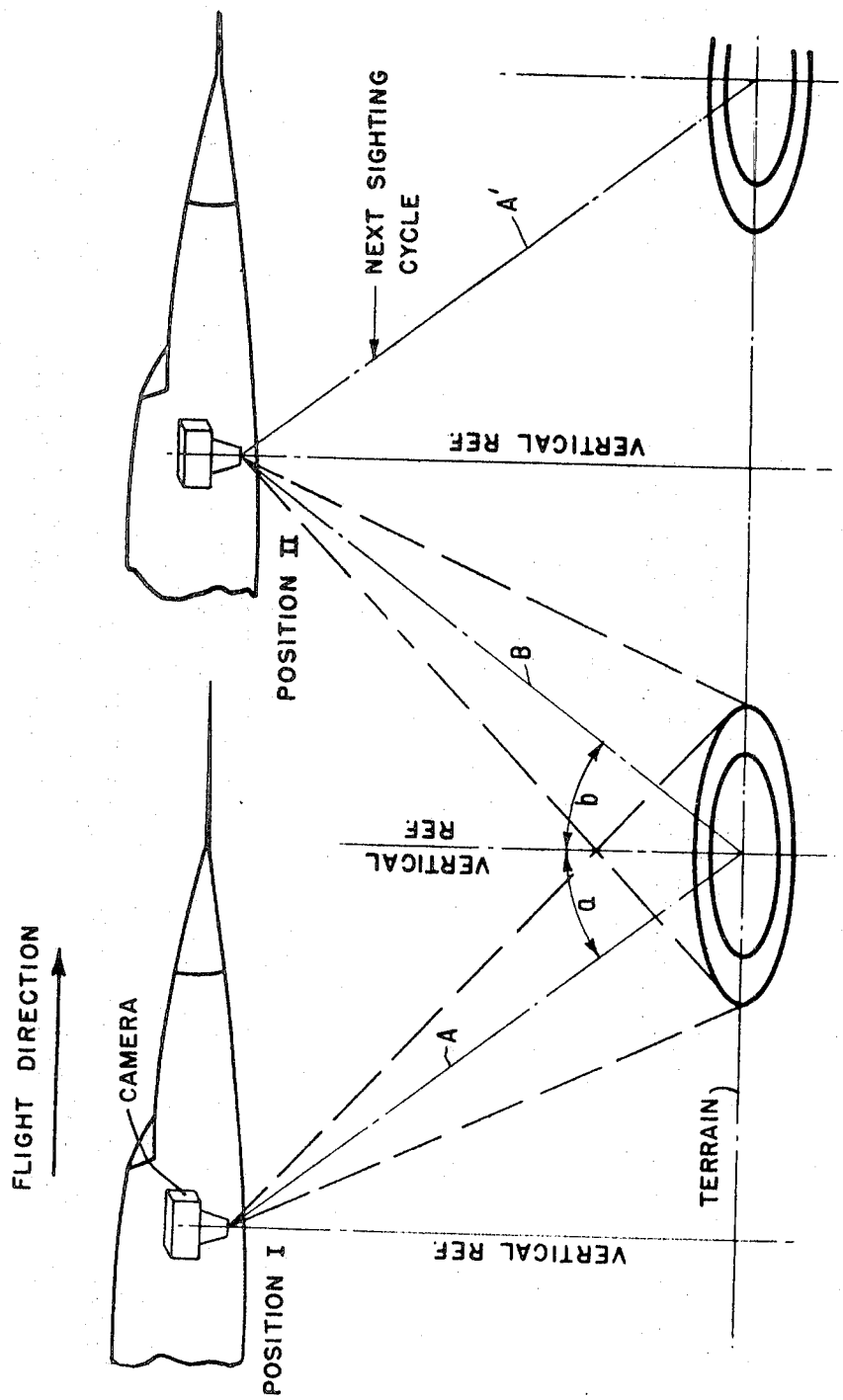
Figure 22:
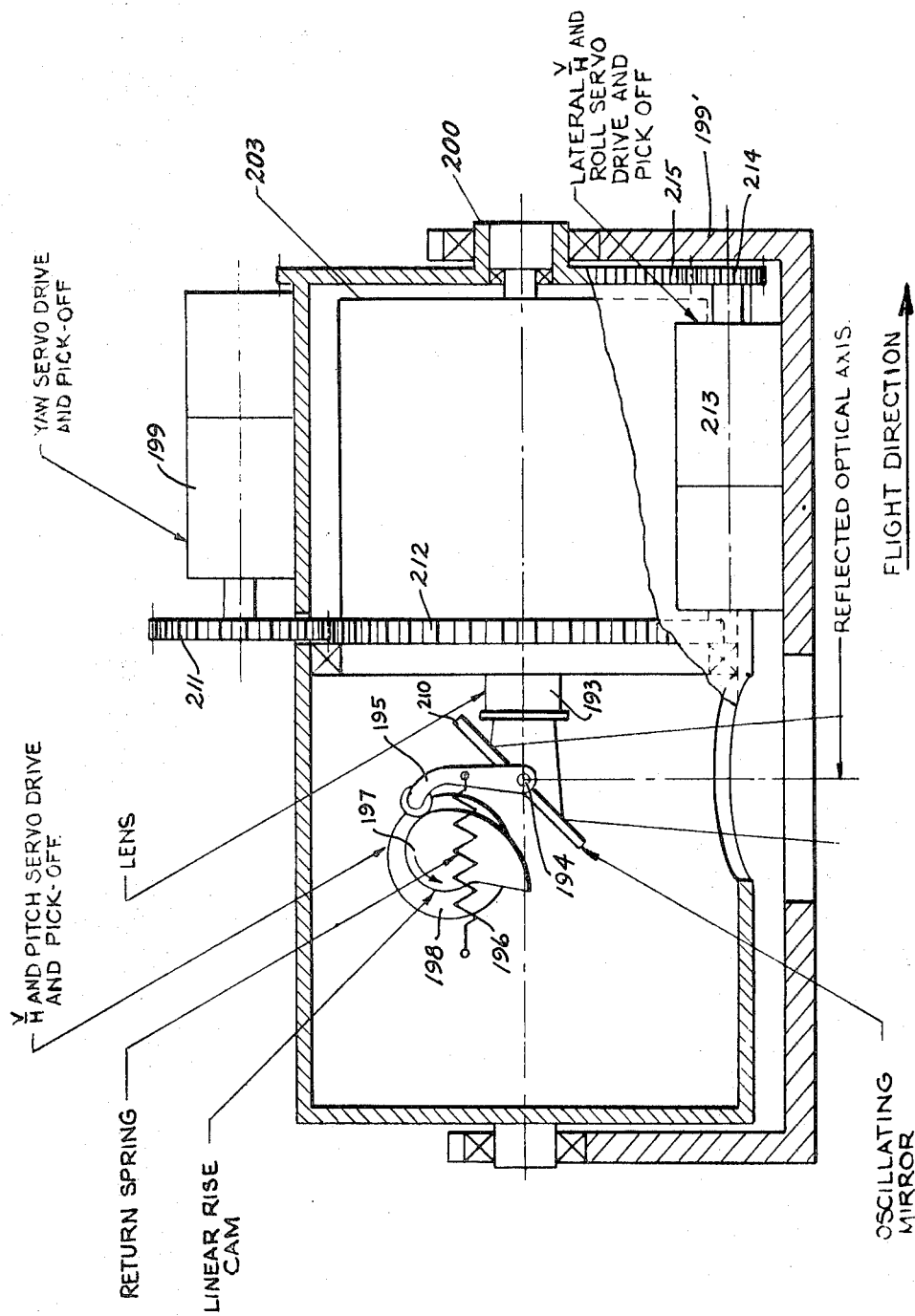
Figure 21:
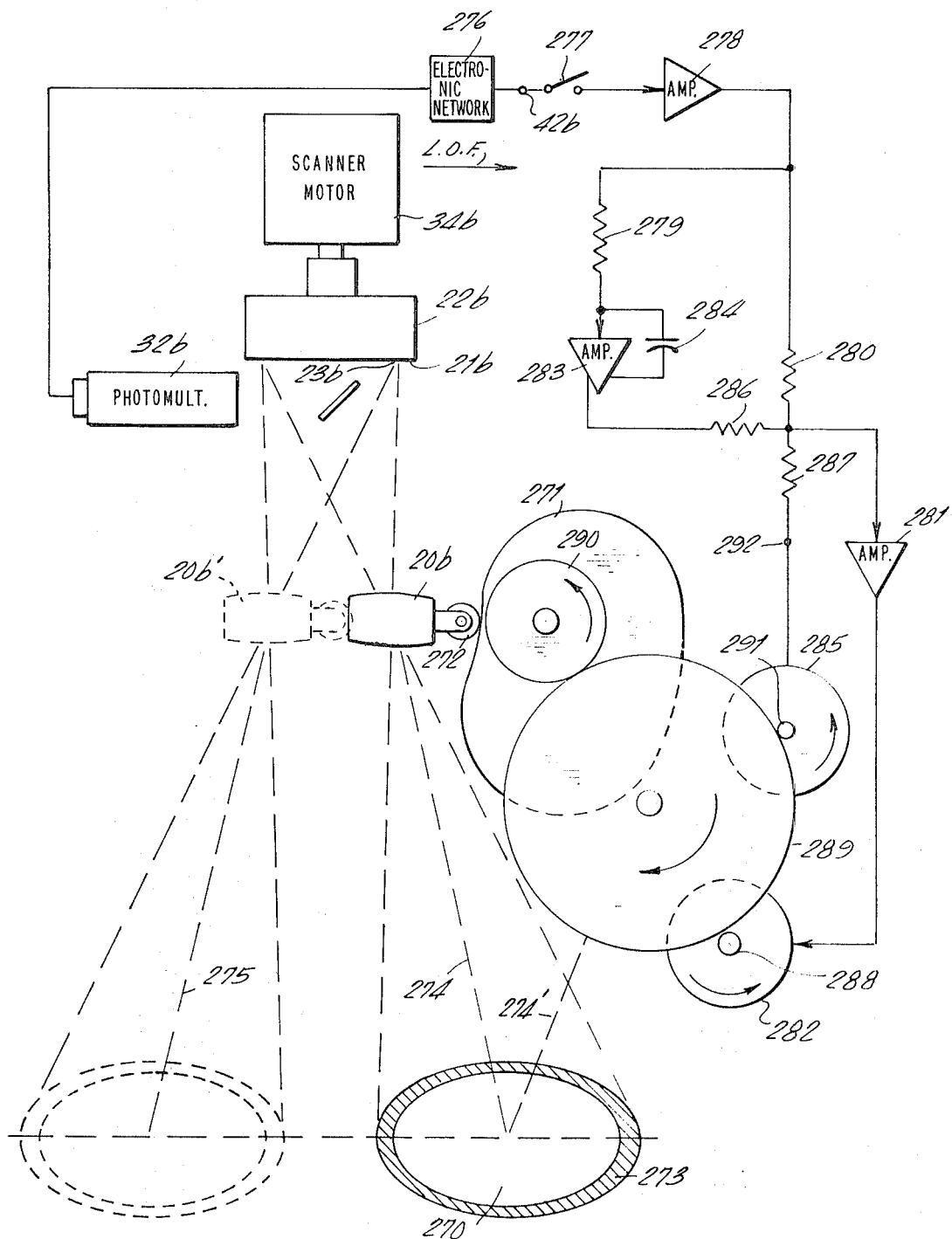

FIG. 7 graphically illustrates two signals typical of the system of the invention;

FIG. 8 shows a front elevational view of a mosaic type of scanner according to the invention;

FIG. 9 is a sectional view of the structure of FIG. 8 taken along the line 9—9 of FIG. 8 in the direction of the arrows;

FIG. 10 shows an antenna scanning arrangement;

FIG. 11 is a simplified view of a scanning assembly in accordance with the invention, showing the possible paths of illustrative optical rays;

FIG. 12 shows a detail of a rotary aperture of the device of FIG. 11 and defines symbols and coordinates used in the description of the system;

FIG. 13 is a functional block diagram of one possible arrangement of the electronic portion of the system;

FIG. 14 illustrates pulse trains which occur at various points of the system;

FIG. 15 shows possible application of the invention to the automatic control of the field angle of an objective lens;

FIG. 16 is an isometric exploded diagrammatic illustration of a structure for automatically controlling a variable focal length lens and a masking disc;

FIG. 17 is an electronic block diagram showing an alternative disposition of part of the system shown in FIG. 13;

FIG. 18 illustrates diagrammatically a scanning technique utilizing a square scan pattern;

FIG. 19 diagrammatically illustrates a ground tracking operation and the switchover from one scanned area to the next scanned area during flight of an aircraft;

FIG. 20 is a simplified block diagram of one system of the invention as applied to ground tracking;

FIG. 21 represents an application of the invention to an automatic V/H sensor of the type used for the control of image motion compensation in aerial cameras;

FIG. 22 illustrates a scanner structure adapted to tracking of the ground;

FIG. 23 illustrates the manner in which a satellite camera may be combined with the system of the invention; and FIG. 24 illustrates an application of the invention utilizing fiber optics to transmit light from the lens and scanning aperture.

The basic approach of the invention can be explained by way of a description of the application of the system to the automatic guidance of an air-to-ground missile.

Figure 1:
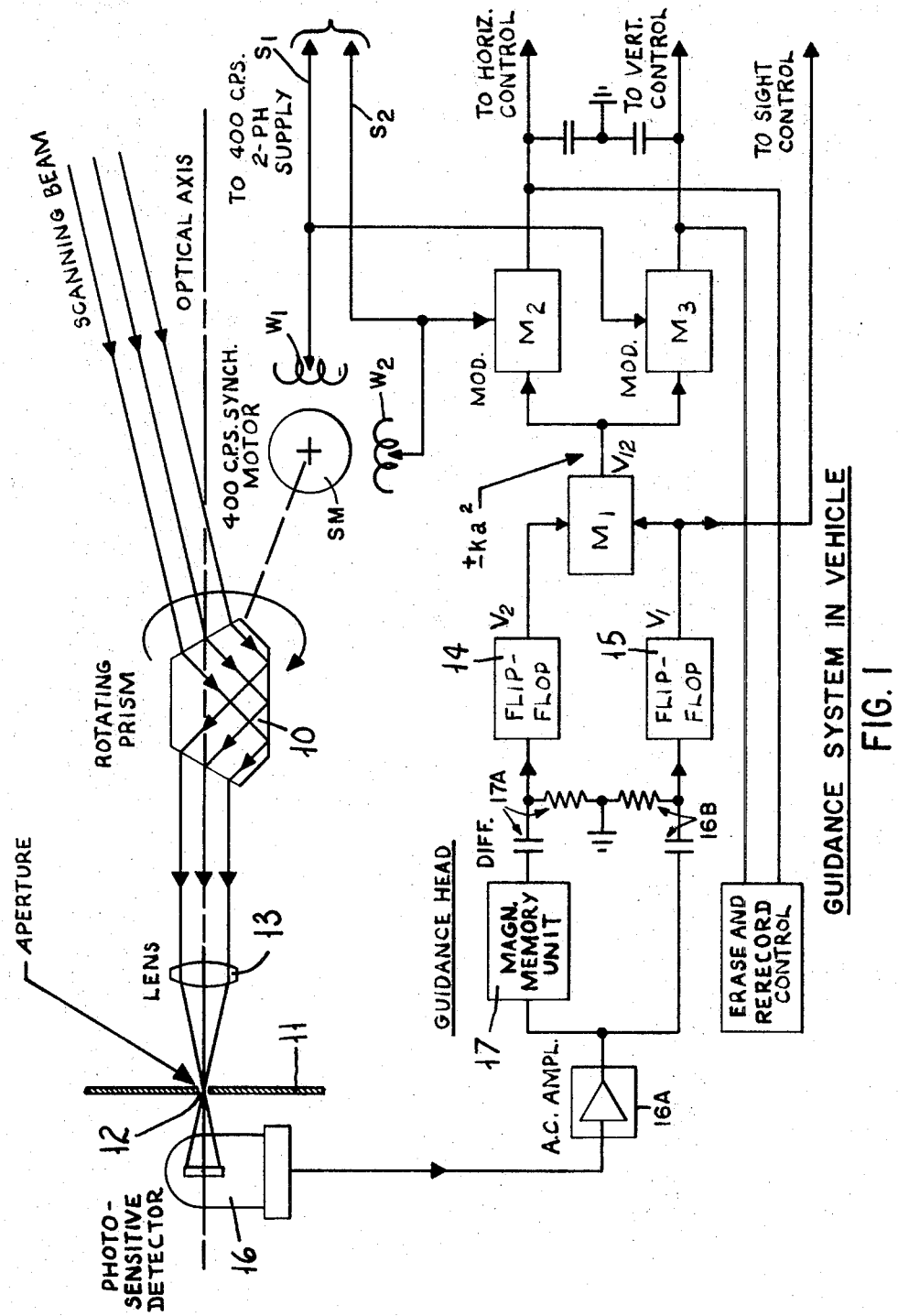

The field of view of the apparatus may be in the form of an annulus centered on the selected target. In FIG. 1, this annulus is continuously scanned through the equivalent of a rotating radial aperture, including a rapidly rotating prism 10, a fixed aperture 12 and an objective lens 13. This arrangement is far simpler than all-electronic scanning, does not involve any linearity or retrace problems, and allows wide freedom in the choice of spectral sensitivity of the photodetector 16. Moreover, it is active 100 percent of the time, thus delivering information at a maximum rate. Since the aperture 12 functions as an optical field stop, no other such field stop is needed. This eliminates aperture modulation, i.e., the generation of spurious signals due to the scanning of a separate field stop by aperture 12. In effect, this high-speed rotary scanning system dissects the image of the target-surrounding terrain. The image is converted to an electrical signal which represents the brightness of the terrain as a function of time over each scan. Since the image is scanned repetitively, the electrical voltage which represents any scan can be compared to that representing any other scan.

Since the target viewed repeatedly from the same aspect generates an identical electrical signal on each scan, comparison of scans for a missile which heads directly toward the target will produce no substantial error signal. However, if the target aspect changes, the images will no longer exactly coincide, and comparison of corresponding scans will produce an error signal.

At selected times during travel of a vehicle carrying the apparatus of the invention, the video scanner output, appearing in the output of amplifier 16A, derived from photosensitive detector 16, is stored in a magnetic recording memory unit 17, allowing subsequent scans to be compared with the stored one. The recorded scan may also be periodically erased and a new scan immediately recorded.

To facilitate further processing, the two video signals resulting from a first scan and a subsequent scan, are converted to binary signals. This conversion is obtained by triggering two bistable multivibrators or flip-flops 14 and 15 from the differentiated video signals. This is accomplished by applying the first video signal from the storage unit 17 to a differentiating circuit 17A and the second video signal from amplifier 16A to a differentiating circuit 16B. The outputs of the flip-flops consist of two series of constant amplitude pulses of variable width and time position.

Let these two series of pulses be designated by $V_1(t)$ and $V_2(t)$, where $V_2$ is the binary transform of the recorded scan and $V_1$ is the binary transform of any subsequent scan.

Binary coding of $V_1$ and $V_2$ allows them to have only two discrete values. Circuit design is such as to cause these values to be equal in amplitude but opposed in sign. Thus $V_1(t)=\pm a$ and $V_2(t)=\pm a$.

The degree of correlation between $V_1$ and $V_2$ is next obtained by a multiplication process in a balanced modulator, lthe output of which is $V_{12}=\pm ka^2$, where $k$ is a constant. If there was no change in the field of view between the two scans, then $V_1=V_2$ and the output of modulator $v_{12}=ka^2$, i.e., pure DC. Actually, the ever present system noise causes some random pulses of reverse polarity. $V_{12}$ does not, however, show any definite periodicity. In modulators $M_2$ and $M_3$, intermixing of signal $V_{12}$, which is carried out with "in-phase" and "in-quadrature" signals at scanning frequency, will thus produce no net output. These in-phase and in-quadrature signals applied to modulators $M_2$ and $M_3$ are derived from AC power sources $S_1$ and $S_2$ which are supplied to the windings $W_1$ and $W_2$ of a synchronous motor S which serves to rotate prism 10 at the desired scanning rate. The intermodulation of signals $S_1$ and $S_2$ with $V_{12}$ in modulators $M_2$ and $M_3$ involves a process commonly known as synchronous detection.

A small positional change within the field of view occurring between the scans will generally cause $V_1$ to be different from $V_2$. $V_{12}$ will then comprise substantial negative "error" signals. The character of these error signals depends directly on the kind of motion causing the change within the field of view. If the motion is a simple translation on the optical axis, there again will not be periodicity in $V_{12}$ and no net output will appear at $M_2$ and $M_3$.

A lateral displacement, however, causes the equivalent of a modulation of the scanning velocity. When image displacement and scanning are in the same direction, the relative scanning velocity is lowered by an amount depending on the rate of lateral image displacement. Conversely, when image displacement and momentary scanning direction are opposed, the relative scanning velocity is increased. It is thus clear that the relative scanning velocity undergoes a sinusoidal phase modulation. This in turn causes alternate spreading and bunching of signal $V_1$. This effect is a periodic one and occurs at scanning frequency. Its phase relative to the scanning process is entirely determined by the direction of image displacement. Therefore, the output of $M_2$ and $M_3$ now yields DC "motion" signals of a magnitude and sign directly related to the components of the above displacement in two orthogonal directions referred to as "vertical" and "horizontal" in FIG. 1. These signals may be used, for example, to steer the vehicle carrying a device in accordance with the invention, back to its target.

The ultimate accuracy of the sensor is essentially limited only by image quality (optical resolution) and system noise. With good visibility, an accuracy of a small fraction of a degree is entirely practical. To exploit such capability, a correspondingly accurate and stable aiming device must be available. Moreover, means to align such aiming device and to maintain it in equally accurate alignment with the missile optical guidance system are also required. However, boresighting cannot be relied upon to line up the missile guidance and the aircraft aiming systems, since mechanical tolerance buildup between major assemblies of the missile, of its launcher, of the aircraft, as well as their static and dynamic deflections, contribute alignment errors far too great to be tolerated.

Figure 2:
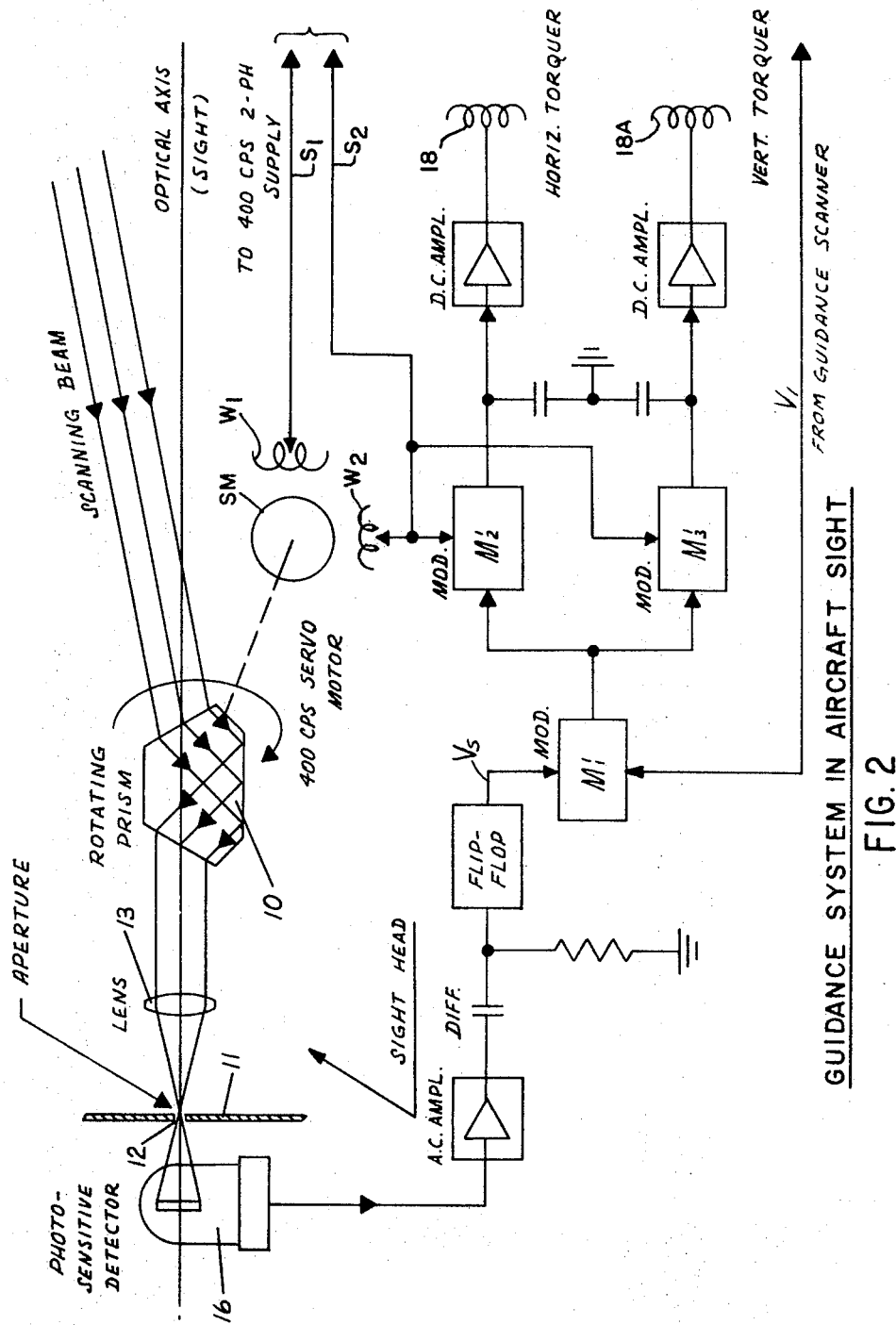

The apparatus of the invention provides a ready solution to this problem. Its sight has a built-in electronic boresighting function, allowing entirely automatic and accurate alignment just before the missile is launched. The aircraft sight (FIG. 2) is equipped with a scanner and sensor assembly identical to that of the vehicle-mounted guidance unit and having the same reference characters in FIG. 2 as in FIG. 1 except that there is no magnetic recording since the reference signal $V_1$ applied to modulator $M_1$, is derived from the vehicle-mounted guidance unit. As the arming switch is actuated, both scanners are activated and synchronized. Output $V_s$ is now compared with output $V_1$ produced by the missile sensor. If the two units are looking at the same subject, $V_s$ is identical to $V_1$. Any optical misalignment between the two units will however result in differences between $V_1$ and $V_s$. Utilizing the very signal processing technique previously described, the aircraft unit generates two positioning control signals. Two sight-mounted torquers 18 and 18A receive these signals and automatically cause the sight to acquire and follow whatever area of the subject at which the guidance unit is aimed. The only requirement is that the original misalignment, if any, be within the acquisition range of the system.

Completion of the electronic boresighting process takes less than one second from the moment of arming and is indicated by a "ready" signal to the pilot, who then maneuvers as required to refine his aim, and launches the missile. At the same instant, the memory and vehicle guidance functions are activated.

THE GUIDANCE ASPECTS

Figure 3:
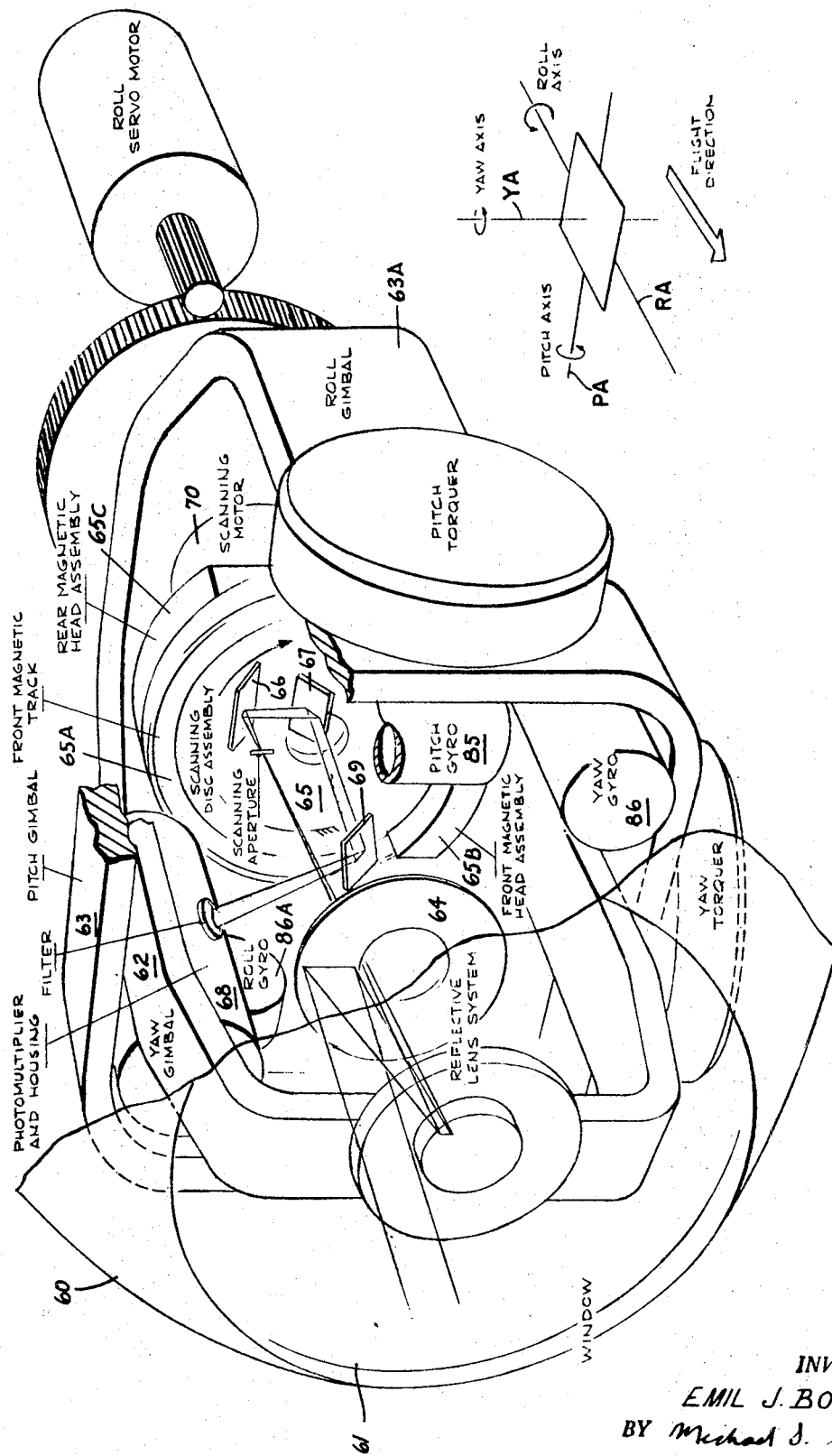
FIG. 3 is a fragmentary perspective illustration of a package which indicates the scanning and control components of one embodiment of the invention.
Figure 4:
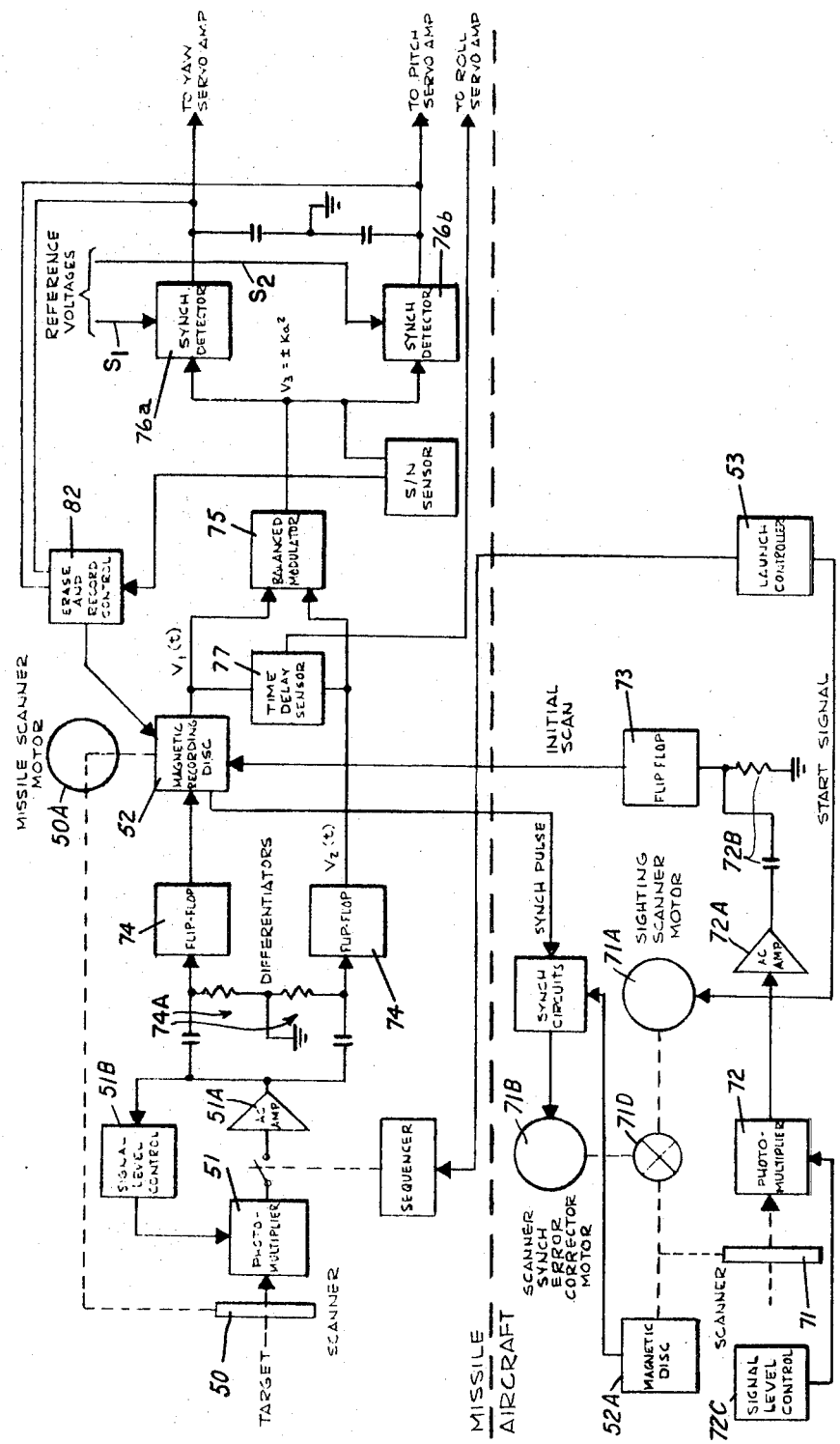
FIG. 4 is a simplified functional block diagram showing the electronic circuitry of one form of the invention.

A missile guidance system according to the invention is shown in FIGS. 3 and 4. It comprises tow major subsystems: the missile-borne guidance and the aircraft aiming sight.

In FIG. 3, which defines the system axes YA (yaw), RA (roll) and PA scanning head, the scanning head, located in the nose portion of the missile 60, is shown. It views the target area through a transparent spherical surface or window 61 in the missile nose and is supported by the yaw and pitch gimbals 62 and 63, which are both pivoted above the center of the curvature of the missile nose to eliminate optical distortions.

The objective 64 is of the reflective type, consisting of a concave annular first element and a convex, or negative, second element. This arrangement features wide aperture, long focal length (which is required for a relatively narrow field), absence of chromatic aberrations and very light weight. The arrangement of components in the mount allows the requisite degree of gimbal motion without optical vignetting.

The lens system images the target area on the front surface of the scanning disc 65 in which is situated a narrow, radial scanning aperture. The light passing through the aperture is reflected through the central portion of the disc by two mirrors 66, 67 spinning rapidly with the disc assembly, and on to the photomultiplier cathode 68 by a third fixed mirror 69. A conical light baffle, located axially in front of the disc, and a cylindrical shield enveloping the photomultiplier, are used to prevent stray light from reaching the cathode 68. A minus-blue filter may be placed in the path to the cathode to improve the system's ability to cut through fog and haze.

Rate-sensing elements used are single-degree-of-freedom gyros such as the pitch gyro 85 and the yaw gyro 86 mounted on the gimbal structure with their input axes mutually perpendicular. Alignment of the gyro components is not critical but the entire package is carefully balanced with small trimming weights during manufacture.

Position pickoffs (not shown), mounted between the set of gimbals, furnish the required yaw and pitch error signals representing missile frame motion with respect to the mount.

The scanning disc assembly is driven by a small synchronous motor 70 through a coupling. On its periphery and on both sides of the scanning disc are two ring-shaped magnetic coatings on which the reference scans are alternately recorded by the respective recording heads as will be explained in detail below. The rear of the disc also carries an additional prerecorded track for synchronizing signals used in particular prior to missile launch for accurate synchronization of rotation of the missile mounted disc with a similar scanning disc situated on the aircraft.

The aircraft sight scanning head (not shown) is functionally similar to the missile scanner, except that it is not supported by a stabilized mount, and does not have provision for magnetic recording of scan signals. It also includes an additional synchronizing servo which slaves its scanning disc to that in the missile. This sensor is normally mounted on the aircraft gunnery sight and accurately aligned with it.

The scan comparator circuits are shown in block diagram form in FIG. 4. During the aiming cycle, the aircraft scanner 71 is in operation. The output of the photomultiplier 72 is a varying voltage which is the analog of light intensity throughout each scan. The voltage is amplified in amplifier 72A, differentiated in network 72B and applied to a flip-flop oscillator 73 to be converted to a binary signal. The output of the flip-flop oscillator 73 consists of a series of constant-amplitude pulses, variable in both width and time-position. These pulses are applied through the missile umbilical connection to the magnetic recording disc 52 in the missile sensor.

This recording disc and the aircraft scanner disc both contain prerecorded groups of identical synchronizing pulses, which are continuously compared in the aircraft sighting head to exactly synchronize it with the missile scanner. In the missile system, the same pulses control, in addition, a portion of the yaw and pitch electronics.

Missile aiming and launching functions are controlled by the launch controller 53, located in the aircraft. This unit is basically a selector which sequences the missiles in proper launch order and which initiates the signals to aim and fire each missile. Its inputs are the preset sequence and the FIRE button. It is electrically linked with the sequence switch in the selected missile and with the aircraft sensor. The READY, LAUNCH, and ABORT indicators for each missile, and the system power controls and indicators are also located on this unit.

As soon as the missile is launched, the varying-voltage output of the missile sensor photomultiplier 51 is switched on. This voltage is converted to binary form via the differentiator circuit 74A and flip-flop circuits 74 and immediately compared with the recorded reference scan.

It should be noted that, while in flight, the reference signal is obtained from the recorder 52; the initially stored scan is derived not from the missile sensor, but as indicated in FIG. 4 from the sensor in the aircraft. This totally eliminates aiming errors from deflections between the missile launching rails and this guidance gunnery sight. The reference scan is as accurately centered on the target as the pilot's aim. The operation of the functional elements of the system represented as the modulator 75, time-delay sensor 77, signal-to-noise sensor and synchronous detectors 76a and 76b will be explained in conjunction with the detailed block diagram of FIG. 5.

The erase and rerecord control 82 (FIG. 4) is used to create new reference scans as required during missile flight. It is triggered by the correlation level, appearing as the signal-to-noise ratio of the correlated scans. When the missile has reduced the range-to-target sufficiently, the scanned area differs materially from the recorded scan. The uncorrelated information produced by the scans constitutes system noise. When the noise-to-signal ratio exceeds a predetermined level, the control 82 is activated. A new scan can only be recorded, however, if the mount error signals are below a predetermined level. This assures that the new reference scan will maintain the desired system accuracy. The original reference scan is not erased, however, until it has been determined that the newly recorded reference is sufficiently accurate. When the new scan is checked and found to be accurate, the system electronically switches over to the new scan as a reference and erases the original scan, freeing that recording surface to accept a still later reference.

The stabilized mount (FIG. 3) keeps the optical sensor pointed at the target regardless of missile motions. Angular pickoffs (not shown) sense any missile frame misalignment with respect to the mount and generate corrective steering signals in pitch and yaw. These signals are then applied to the missile control surfaces. When errors are reduced to zero, the vehicle longitudinal axis is parallel to the sensor optical axis, which projects a line of sight to the target.

The servo loop for any of the three axes is conventional. All three tracking loops are similar. The optical sensor converts image position errors to voltages. The sensor voltages are mixed with the outputs of rate gyros for servo damping and applied to the amplifiers, yaw and pitch torquers and roll servomotor. In normal operation, the sensor voltages override the gyro outputs. Should the sensor output voltages momentarily fade, as may be due to smoke or haze, the rate gyros tend to keep the mount in the right orientation. Normal optical tracking resumes when the target area is again visible.

It should be noted that the system is inherently immune to all electronic countermeasures presently known, since it neither radiates nor receives radio signals. It responds only to light and it would be exceedingly difficult to generate light in the manner and amount required to affect it.

It is anticipated that bright lights (whether time-modulated or not) may be suggested as a means to simulate spurious targets. Therefore, as shown in FIG. 4, the system is equipped not only with gain control circuits 51B and 72C, but also with peak-limiting circuits in the form of flip-flops 73 and 74 to discriminate against all unusually bright targets. This technique is the equivalent of electronic "sun glasses" protecting against blinding. Any steady light or lights (regardless of brightness) occurring within the field of view and of sufficient duration to be recorded and subsequently scanned would merely tend to increase accuracy, as they would become part of the stored reference.

Figure 5:
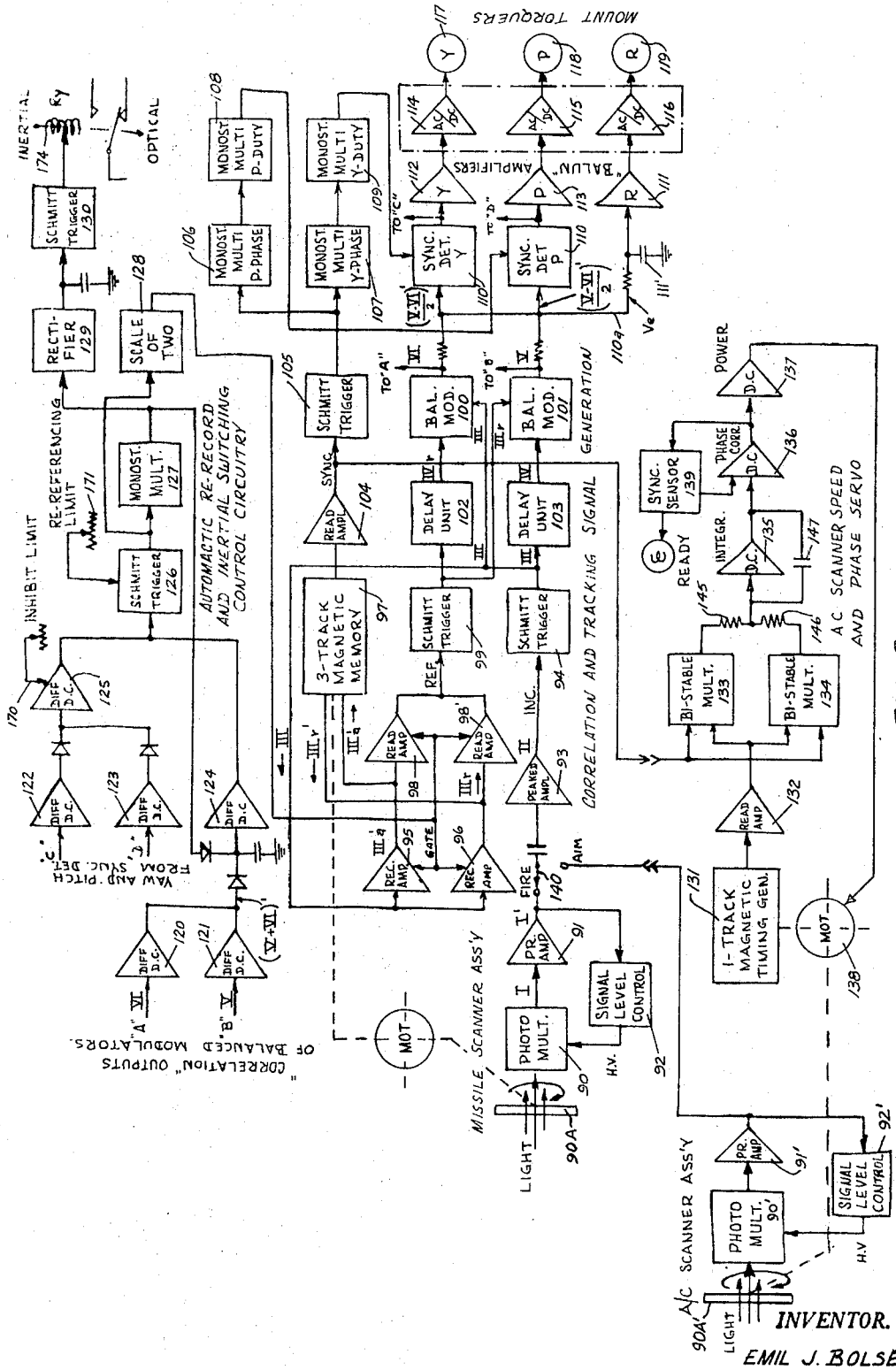
FIG. 5 is a detailed block diagram showing the components of the system of the invention located in a missile and in an aircraft from which the missile is launched.

Referring to FIG. 5, target information is received in the form of light, an image being focused in the plane of the scanning slit on scanner 90A, which revolves 200 times per second. Photomultiplier 90 translates the optical information into electrical signals, which are amplified by video preamplifier 91. This preamplifier is nonphase-reversing, and DC-coupled. Therefore, the average DC level at the output of this amplifier depends on the average output of the photomultiplier. An increase of the photomultiplier illumination causes the DC level at the output of the preamplifier to become more negative.

Figure 6:
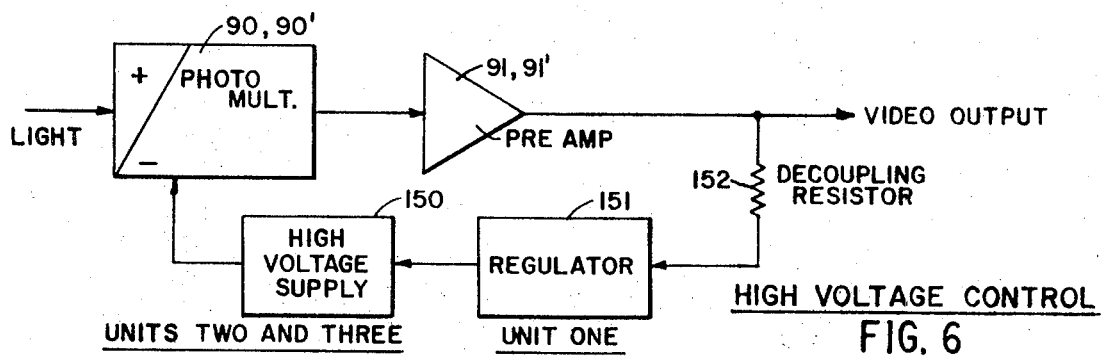
FIG. 6 is a block diagram illustrating the gain control of a photomultiplier using a variable high voltage supply of the system of the invention.

The signal level control circuit 92 as shown separately in FIG. 6 comprises three functional sections. The first is a conventional transistorized series regulator 151 controlling the input to block 150 as dictated by the DC level at the output of video preamplifier 91. When this DC level becomes more negative, the regulator section decreases the input to block 150. Section two (incorporated in block 150) is a transistorized oscillator of conventional design operating at a frequency on the order of 100 kilocycles (kc.), while section three (also incorporated in block 150) conventionally rectifies the AC output of the oscillator, converting it into a filtered high voltage for the photomultiplier voltage divider. Owing to the high frequency of oscillation of section two, it is possible to use relatively short time constants in section three, allowing the high voltage, hence the gain of the photomultiplier, to rise and fall significantly not only with changes of average illumination, but also with the much faster changes of average illumination, but also with the much faster changes of illumination which occur cyclically during scanning. The result is a general decrease of the amplitude of the signals furnished by the photomultiplier within the passband of the high-voltage regulator and supply. Time-constants are so chosen that frequency components of 1,000 cycles and below are sharply attenuated, whereas little or no attenuation occurs for signal components of 5 kc. and up. This is similar to high-pass filtering, but also allows the system to accommodate automatically a range of light levels of several decades without preamplifier overload.

The video signals, further amplified by moderately peaked amplifier 93, (FIG. 5) finally reach Schmitt trigger circuit 94. At that point, low-frequency signals have been essentially eliminated, and high-frequency signals much in excess of 10 kc. have also been attenuated. This reduction in the amplitude of high frequency contents is necessitated by signal processing circuitry which follows.

Schmitt trigger 94, which is functionally equivalent to flip-flop 74 in FIG. 4, converts the analog information carried by the processed video signal into a quantized two-level signal. Switching from one state of the Schmitt trigger to the other occurs whenever the video signal crosses the zero axis. Following Schmitt trigger 94 (FIG. 5), the signal path branches out into three directions. First, the signal reaches the input of recording amplifiers 95 and 96, which operate alternately. A gating arrangement, to be described later, causes recording amplifiers 95 and 96 to be alternately operative and disabled. While recording amplifier 95 is operative, the signal goes into its associated recording head of the three-track magnetic drum 97, while read amplifier 98 is disabled by the same gating signals.

Binary signals produced by the Schmitt trigger 94, further amplified by recording amplifier 95 are thus recorded on one of the tracks of the magnetic memory 97, still in binary form. At some later time, recording amplifier 95 is gated "off," while read amplifier 98 is turned "on" and Schmitt trigger 99, receiving the output of read amplifier 98, produces a binary signal similar to the binary signal originally produced by Schmitt trigger 94 and recorded on the magnetic track.

At that time, Schmitt trigger 94 may or may not be producing exactly the same binary signal that it did at the time recording took place. If no relative displacement or other significant changes have occurred between the tracker and its target area, the signal will be identical. If, however, any displacement has occurred in the meantime in roll, yaw, pitch or range, the signal furnished by Schmitt trigger 94 will no longer be identical to the signal originally recorded on the magnetic drum.

Pulse timing comparison between the reference signal reproduced by the magnetic memory and the new incoming signal determines the type and amount of motion that has occurred. This is done, for example, by multiplying the two signals in balanced modulators 100 and 101.

Delay units 102 and 103 are inserted between Schmitt trigger 99 and balanced modulator 100 as well as between Schmitt trigger 94 and balanced modulator 101. These delay units introduce a time-bias in the system, which is necessary to determine not only magnitude of displacements, but also their direction.

To illustrate the operation of the system, consider as a displacement a rotation around the optical axis (roll). This produces a fixed time difference between reference and incoming signals. Rotation with the scanning motion advances the incoming video information on the time axis, while rotation against scanning motion delays it.

While the incoming signal is thus affected by roll motion of the system, the recorded reference signal is not affected at all. As a result, the output of the balanced modulators, in which the signals are cross-multiplied, would, in the absence of delay units 102 and 103, decrease from a maximum value as some function of the roll motion. This decrease in amplitude would be the same regardless of the direction of roll. Delay units 102 and 103 produce equal symmetrical time differences in the signals applied to inputs of balanced modulators 100 and 101. Thus as roll occurs in one direction, output of balanced modulator 100 would, for example, increase while output of balanced modulator 101 would decrease, and vice versa. Because balanced modulators 100 and 101 are of the push-pull type, as one of the outputs of balanced modulator 100 increases, its second output would decrease. This allows adding, on connection 110a, in the proper phase, signal from balanced modulators 100 and 101. After averaging, the result is the "S"-shaped curve shown in FIG. 7, which resembles the output of an FM discriminator.

Extraction of yaw and pitch signals requires further processing. Because both yaw and pitch produce cyclically varying time differences, they cause periodic signals at the output of balanced modulators 100 and 101 (FIG. 5). The frequency of these signals is that of the rotation of the scanning disc, namely 200 cycles per second in this example, and their phase depends on the magnitude and direction of the pitch and yaw errors present in the system.

To extract yaw and pitch signals from the combination of signals which appears at the output of the balanced modulators, a time reference is required. Time reference signals have been recorded during manufacture on the third track of the magnetic drum of memory 97. Read amplifier 104 receives the time signal and feeds Schmitt trigger 105 (as well as multivibrators 133 and 134 before launch, to synchronize the sight scanner). This in turn controls monostable multivibrators 106 and 107, which further trigger monostable multivibrators 108 and 109. The output of monostable multivibrator 108 is a 200 c.p.s. square wave, phased to produce a net DC voltage at the output of synchronous detector 110 whenever pitch signals are present in the output of balanced modulators 100 and 101. Similarly, monostable multivibrator 109 produces a 200 c.p.s. square wave applied to synchronous detector 110' and having the required phase to detect only yaw signals. In other words, the synchronous detectors 110 and 110' effect a cross-multiplication in essentially the same way as the balanced modulators, and by cross-multiplying the error signal with separate reference signals obtained from the third track of the magnetic memory, the synchronous detectors serve to separate and allow transmission to the yaw and pitch torquers signals which operate them in the manner required.

Roll signals are smoothed by filter capacitor 111' and applied to amplifier 111, while yaw and pitch signals, similarly smoothed by other capacitors (not shown), are respectively amplified by amplifiers 112 and 113.

The outputs of amplifiers 112, 113 and 111 have the required DC level and magnitude to drive the respective mount amplifiers 114, 115 and 116. These in turn drive torquer 117 in yaw, 118 in pitch, and 119 in roll. The torquers control the gimbals of the mount which carries the missile scanner assembly. The gimbals are driven to null out any angular deviation sensed by the system. Because angular deviations are constantly nulled out, the system always tracks its original target.

It should be noted that the system is sensitive to position only and not to angular velocity. Thus, it is drift free. Accuracy of tracking in roll, yaw, and pitch, in the absence of change of range, is only limited by servo deadband and electrical noise in the system.

When used as a missile guidance system, the system would be mounted on a moving vehicle, which is closing with a target. This situation introduces an additional displacement, change of range. Because the field of view is angularly constant, the video signal produced by the photomultiplier and processed by the associated electronics is progressively modified as the missile closes in. The result is a progressive decorrelation between the incoming and the recorded signals and a decrease of the output of balanced modulators 100 and 101. This change of output which is minimized by the use of a radially elongated scanning aperture is essentially the same in both balanced modulators and therefore does not produce any directional signals. It simply decreases the magnitude of the directional signals which would be produced by roll, yaw, or pitch deviations of the scanner assembly. When the missile closes in, therefore, the gain of the servo loop is progressively reduced.

Another effect which occurs for changes of range is a decrease in the signal-to-noise ratio. If this were allowed to continue unchecked, the quality of tracking would deteriorate unacceptably. This is prevented by an automatic reference record control circuit, comprising differential DC amplifiers 120, 121, 122, 123, 124, 125 and associated trigger circuitry 126 and 127, that senses the "quality" of correlation by metering the output of balanced modulators 100 and 101. When the output of these balanced modulators drops below a preset level, indicating impending deterioration of tracking accuracy, scale-of-two circuit 128 is triggered, causing a switchover between the magnetic tracks furnishing the reference signals. As explained above, while record amplifier 95 is disabled and read amplifier 98 furnishes a reference signal to Schmitt trigger 99, record amplifier 96 is active, continuously recording the latest incoming signal processed by Schmitt trigger 94. Any reference previously recorded is continually erased as a new recording is impressed on the magnetic coating of the drum assembly. In this fashion, whenever scale-of-two circuit 128 changes its state, the video signal just processed by Schmitt trigger 94 becomes a new reference and the output of balanced modulators 100 and 101 again reaches its normal full correlation level. Simultaneously, the signal-to-noise ratio is restored to its initial value and so is the sensitivity of the system to the various motions.

To insure unimpaired tracking accuracy, rereferencing is inhibited momentarily if excessive directional signals are present at the output of the yaw and pitch detectors 110' and 110. Indeed, the presence of large signals at these points would indicate that the scanner does not have the proper orientation in respect to target; rerecording under such conditions would cause a momentary error to become a permanent one. This rerecord inhibit function is carried out by differential amplifiers 122, 123, and 125 as follows:

A directional signal present at the output of the synchronous detectors 110 and 110' causes an increase in the magnitude of the signal applied to Schmitt trigger 126. Such an increase is interpreted by Schmitt trigger 126 as a normal correlation signal. Triggering of Schmitt 126 thus does not yet occur and rerecording is delayed until no substantial errors exist in yaw or pitch. Then rerecording proceeds automatically. Whenever correlation drops below a preset level, Schmitt trigger 126 operates, and is reset by a pulse produced by monostable multivibrator 127, which also momentarily charges the integrating capacitor at the input differential amplifier 124. In the absence of steady correlation, this capacitor does not remain charged, allowing the Schmitt trigger to operate again, repeating the above cycle. Each time, monostable multivibrator 127 furnishes an output pulse. These pulses are rectified by frequency sensitive rectifier 129, which is capacitively coupled and produces a DC output signal essentially proportional to the frequency at which Scmittt trigger 126 and monostable 127 are triggered. Whenever they are triggered in rapid succession, such as is the case in the absence of optical input, or at the end of the missile run, a substantial DC voltage appears at the input of Schmitt trigger 130, triggering the latter; it, in turn, energizes a relay controlling switchover to pure inertial guidance by means of the three rate gyroscopes carried by the missile scanner assembly. This situation prevails until good optical information is again available, at which time a reference is immediately recorded on whatever track is presently used for rerecording. A fraction of a second later, triggering of Schmitt trigger 126 will cause this recording to become a working reference, reestablishing correlation and optical guidance conditions.

The magnetic drum sections of the aircraft and missile scanners each provide one magnetic track for the purpose of synchronization and time reference. In order to use the simplest possible synchronizing signal, precisely one-half of the synch-track is saturated first in one direction and then in the other direction. After signal processing, the synchronizing signals delivered to the synchronizer consist of a train of positive and negative pulses separated by exactly 180°. The error detector consists of the two flip-flops 133 and 134 and a resistive summing network 145, 146. The flip-flop 134 is triggered by positive pulses. The flip-flop 133 is triggered by negative pulses. The combined output of multivibrators 133 and 134 consists of a series of pulses having an average value which depends on the relative time position of the two timing signals coming from the aircraft scanner assembly and from the missile scanner assembly respectively. This series of pulses is applied to an integrating DC amplifier 135, which removes most of the ripple from the signal produced by the bistable multivibrators, and applies the signal to phase-correcting DC amplifier 136.

The purpose of the phase-correcting amplifier 136 is to partly compensate for phase lag introduced into the servo loop by the motor and the integrating amplifier. It is known that, in order to obtain the desired accuracy of synchronism between the aircraft scanner assembly and the missile scanner assembly, it is necessary to provide a servo amplifier having a very high gain and that stability can be achieved only by careful balancing of frequency response and phase characteristics of the entire loop. Amplifier 136 is primarily responsible for this balance. The output of amplifier 136 feeds power amplifier 137 which raises the signal level to that required by the motor 138.

The system in accordance with the invention is quite flexible and is adaptable to a variety of air-to-ground and ground to ground missiles and other modes of operation. It may be also used with a photographic reference and in this mode of operation, at least one scan obtained from a photograph of the target area is inserted at some time prior to launch, into the scanner. Alternately, the photograph itself may be carried in the missile and scanned. This photograph then becomes a source of accurate reference signals. As soon as the target area enters the scanner's field of view, correlation occurs and the system generates correction signals in yaw and pitch as required to properly guide the missile. The photograph should be properly oriented, be of a suitable scale (not critical) and preferably be one taken from the same direction from which the missile is approaching the target and under similar lighting conditions, in order to insure that sufficient correlation will occur.

In some tactical situations, it may not be practical to obtain a photograph of the target at some time prior to launching of the missile. A mode of operation is possible, whereby no photograph is needed, the required guidance reference being inserted electronically into the missile guidance scanner just prior to launching, or even during its flight, by radio transmission. In this mode, a properly equipped reconnaissance aircraft carries a sight having a scanning sensor similar to the missile scanner. The plane is further equipped for wideband audio bandwidth transmission. As it flies in the target area, aim is taken with the sight and a short signal of as little as one scan duration, carrying the video information obtained from the sight, is sent to the missile by radio.

After demodulation, this signal is recorded magnetically in the missile guidance system and stored for use in the terminal guidance or "homing" phase.

Because of the greater space available, it is possible to provide in the aircraft a scanning assembly whose optics are superior to those of the missile. Further, while the aircraft scanning system will initially be aimed at the same target as the system of the missile, their field angles may be different by as much as 30 percent. Thus, if the field of view of the aircraft scanning system is that much smaller than that of the missile, this smaller field of view can be precisely scanned with the aircraft assembly. This furnishes an accurate reference to the missile that will be useful for a substantially longer part of its flight before a new reference will be needed, thereby improving the degree of accuracy of the system. Moreover, it is of course possible to operate the scanner of the missile with one or more references introduced from a photograph, for example, rather than as the result of aiming at the target by the pilot.

While, in the above-described embodiments, the carrier for the magnetic recording tracks is shown fixed to the scanning disc, this arrangement is not absolutely essential and, instead, the structure which carries the magnetic recording tracks may be separate from the scanner disc and driven in synchronism through a suitable servocontrol.

Furthermore, while magnetic recording tracks have been described and shown as storing the signals, it is also possible to use in known manner a more "volatile" arrangement as, for example, a digital shift register, or a delay line system which would compare each scan with the next following scan. In this way, while there would not be a reference signal against which a number of consecutive scans are compared, a scan-to-scan comparison would furnish error signals that may nevertheless be adequate for some purposes.

While delayed reference and incoming signals have been shown as being produced by delay units 102 and 103 of FIG. 5, signals similarly offset in time may be produced in known manner by one reference recording head and two reference playback heads which are offset with respect to, and located on either side of, the recording head at the distance required to produce a preselected time delay.

Where the signal obtained is strong enough to render the multiplication effect of a photomultiplier unnecessary, a photocell of the vacuum or gas-filled type, or one of the semiconductor type, or a combination of several photodetectors may be used.

While the aperture of the scanning disc is shown as having a sector shape, other shapes are of course possible. Moreover, the scanning disc may, if desired, be driven pneumatically as by having turbine buckets at its periphery receiving a stream of air of a pressure sufficient to spin the disc at the desired speed which may be in the range of 200 rotations per second.

In addition to the uses described above, the system of the invention may be used in an automatic bomb sight for relating the speed of the aircraft and its altitude to the target so as to determine the proper instant for launching a bomb from the aircraft.

The system of the invention may also be used to scan an airfield as a plane approaches the airfield during landing so as to provide automatic landing controls for aircraft.

FIGS. 8 and 9 illustrate another embodiment of a scanning structure according to the present invention. This scanning structure includes a mosaic of sensitive elements 321. For example, the elements 321 may be in the form of photosensitive segments made of sulfide of selenium or cadmium, but in case it is desired to operate with image-forming sources other than light, it is possible to make the segments 321 of materials sensitive to infrared, ultraviolet, etc. The several sensitive segments 321 are carried by a plate 320 which insulates the several segments 321 from each other and this plate 320 is formed with an opening through which a shaft 322 freely extends. The shaft 322 is rotated at a constant speed by any suitable synchronous motor or the like, similar to any of the above-described motors which rotate the above-described scanning discs. The end 324 of the shaft 322 which is located beyond the plate 320 carries a brush 323 which, during revolution of the shaft 322, moves from one segment 321 to the next around a circle. The circuit is completed by the slip ring 325 and the conductors 326 and 326A shown in FIG. 9, so that as the shaft 322 rotates, the brush 323 moves from segment to segment to obtain the signals from the various segments. From the time that any one segment has been contacted by the brush 323 until the next time the same segment is contacted by the brush, this time being equal to the time required for one revolution of the shaft 322, the energy which has been received by the particular segment from the target will have been stored on the segment and will then be "drained" from the segment by contact with the brush. In this way the several segments 321 will also serve in combination with the rotary brush 323 to scan the pattern of the area which surrounds the target, and the energy derived from the several segments 321 is converted directly into an electrical signal, so that with this embodiment it is unnecessary to use a photomultiplier or a scanning aperture. However, in every other respect, the structure of FIGS. 8 and 9 cooperates in the manner described above with the rest of the circuitry to produce the above-described results.

If, however, it is required that the system operate under conditions of widely varying intensity of input radiation, known means for automatically controlling the intensity of radiation reaching segments 321 may be used in the form of an automatic diaphragm control servosystem.

It is also possible to use other known means for the purpose of attenuating the radiation reaching segments 321, such as graded, stepped or neutral density filters, or other nonneutral filters, polarizing means of controllable orientation to one other, and the like.

Alternately, the amplitude of the electrical signals produced by certain photodetectors may be controlled by varying voltages supplied them in a manner quite analogous to that described above in conjunction with the control of the gain of the photomultiplier.

Another known method of controlling the magnitude of the electrical signals, this method being applicable to the system of the invention, utilizes the nonlinear characteristics of tubes and of semiconductor diodes and transistors. These methods are well known to those versed in the art and need not be further described here.

As is shown in FIG. 10, it is also possible to use the system of the invention with radio waves, a scanning assembly comprising a plurality of directional antennae 455 sensing radio waves reflected from the target or other subject which is scanned. The antennae may be used to send as well as receive the radio waves, or a portion of the array may receive while another transmits. The several annuli of antennae indicated in FIG. 10 are energized in a preselected manner and sequence to provide circular scanning, either by using the directivity of the transmitting elements, or that of the receiving elements, or both.

Of course, the system of the invention can be similarly adapted for use with acoustic waves whether in the air, in water, or in other media. For example, the system of the invention may thus be used to guide a torpedo launched from a submarine to a selected target.

Change Detector

FIG. 11 shows schematically a scanner of the invention adapted, for example, to the comparison of images and for operation with visible light; purely structural parts are omitted from the figure for purposes of clarity. It will be noted that the scanner is very similar to that shown in FIG. 3. An objective lens 20 (FIG. 11) projects an energy pattern in the form of a real image of the subject (not shown) on the faceplate 21 of a rotary housing 22. An aperture 23, which is preferably, but not necessarily radial and wedge-shaped (as shown in detail by FIG. 12), is provided in the faceplate 21 allowing successive portions of the luminous flux of the image to pass through a conventional light-condensing optical train comprising rotary mirrors 24 and 25, fixed mirror 26, rotary lenses 27, 28 and 29 and fixed lens 30 to impinge upon the light sensitive photocathode 31 of a photomultiplier 32.

Housing 22 is fixed on the shaft extension 33 of an electric motor 34 and made to rotate at a relatively constant angular velocity $w$, causing aperture 23 to repetitively scan an annular portion of the image.

Two conventional magnetic heads 35 and 36 are located in close proximity to magnetic recording tracks 37 and 38 of usual type, applied to the periphery of housing 22. During scanner operation, head 36 reads out timing signals prerecorded on track 38, while head 35 may record, and later read out, video signals derived from the output of photomultiplier 32, corresponding to the luminous flux received by photocathode 31, and further processed as shown in detail in FIG. 13.

FIG. 13 is a detailed block diagram showing an arrangement of the electronic components of one embodiment of the system of the invention. Photomultiplier 32 is powered by a special supply 140, which may produce voltages ranging from several hundred to several thousand volts, depending on the illumination of photocathode 31. Varying this voltage permits the adjustment of the gain of the photomultiplier 32 to compensate for variable light levels over a considerable range, as explained above.

The output of photomultiplier 32 is amplified by video amplifier 141, of conventional design, and filtered by network 142, which may consist of a differentiating network followed by a low-pass filter, thus eliminating the DC component, favoring the high-frequency components which carry a larger proportion of useful information than do the low-frequency components and limiting the passband in accordance with the useful bandwidth of the signal.

The output of network 142 is quantized by DC coupled flip-flop 143, which changes state whenever its input reverses polarity, producing a generally random binary signal $V_1$ of amplitude $\pm a$. Although not necessary, quantization of signals is advantageous in this system because it permits use of relatively simple digital circuitry to cross-multiply signals so as to extract the desired information, as will be shown, rather than the more complicated and delicate analog multipliers.

At a selected time $T_{ref}$ during the operation of the device, switch 144 is actuated to momentarily connect head 35 to the output of record amplifier 145A, causing $V_1$ to be recorded on track 37 (see FIG. 11). At a later time $T_{sub}$ switch 144 having been returned to the position shown, the output of head 35, amplified by read amplifier 146A, triggers flip-flop 147A, which generates another binary signal $V_2$ of amplitude $\pm a$, while $V_1$ continues to be generated by flip-flop 143.

If $V_1$ and $V_2$ represent the same subject, but small displacements, or other small changes, have occurred between $T_{ref}$ and $T_{sub}$, they will not differ greatly. This is illustrated by the first two lines of FIG. 14, showing typical signals corresponding to a portion of the scan cycle. Several cases are illustrated therein: the transitions of $V_1$ occurring at $t=c$, $t=g$ and $t=v$ are lagging with respect to the corresponding transitions of $V_2$, which are at $t=b$, $t=f$ and $t=u$, respectively; the transitions of $V_1$ and $V_2$ occurring at $t=j$ are simultaneous, and the transition of $V_1$ occurring at $t=l$ is leading. In addition, two transitions of $V_1$ are shown, occurring at $t=p$ and $t=r$, respectively, which have no corresponding transitions in $V_2$.

The third and fourth lines of FIG. 14 show two further signals, $V_1'$ and $V_2'$, which are respectively identical to $V_1$ and $V_2$, except for a fixed and equal time delay imparted by delay lines 148 and 149 (FIG. 13).

A signal having an amplitude $\pm a$, and equal to one-half the difference of $V_1$ and $V_2'$, is produced by differential amplifier 151 and changed into a series of positive pulses $V_3$ by rectifier 153, while a similar signal, equal to one-half the difference of $V_2$ and $V_1'$ appears at the output of differential amplifier 152, and is changed into a series of negative pulses $V_4$ by rectifier 154. The width of the pulses in $V_3$ is equal to the delay imparted by line 149, plus any lead of $V_1$ with respect to $V_2$ or less any lag, as the case may be. Similarly, the width of the pulses in $V_4$ is equal to the delay imparted by line 148, less any lead of $V_1$ with respect to $V_2$, or plus any lag, as the case may be. As a result, $V_5 = V_3 + V_4$, available at terminal 39, consists of pulses having a width equal to the time-difference between corresponding edges of $V_1$ and $V_2$, a positive polarity for $V_1$ leading $V_2$, as is the case at times $l-m$ and $n-0$, and a negative polarity for $V_2$ leading $V_1$, as is the case at times $b-c$, $d-e$, $f-g$, $h-i$, $u-v$ and $w-x$. In addition, $V_5$ contains two pulses $p-q$ and $r-s$ having a width equal to the line delay, but of opposite polarity, and corresponding to the edges of spurious or uncorrelated pulse $p-r$ of $V_1$. It can be seen that $V_5$ indicates the degree of mismatch existing between the zero-crossings of $V_1$ and $V_2$ and between their polarities, by corresponding pulses.

Since pulses such as $p-q$ and $r-s$ are of opposite polarity, they tend to mutually cancel by averaging. Therefore, the output of low-pass filter 40 is a DC signal, $V_b$, available at terminal 41, which has a value substantially determined by the average of time difference between corresponding pulse edges in $V_1$ and $V_2$.

As has been shown, the signal available at terminal 39 comprises a train of fixed-amplitude positive and negative pulses, each having a duration equal to the time difference $\Delta t$ between the corresponding edges of the pulses of the incoming ($V_1$) and reference ($V_2$) trains, respectively, and a polarity dictated by the algebraic sign of $\Delta t$. It can readily be seen that this signal is entirely analogous to the signal on connection 110a of FIG. 5, even though a different arrangement is shown therein.

Referring to FIG. 12, a point P of the image being scanned is shown at $T_{ref}$ within the aperture 23, an angular coordinate A. At $T_{sub}$, a small, relative image motion PP' has caused a coordinate change $\Delta A$, given by equation:

$\Delta A = B + 1/R [\Delta y \cos A - \Delta x \sin A]$ where $\Delta y$ and $\Delta x$ are components of translation in the y- and x- directions respectively, and B is a rotational component of the image displacement having occurred between times $T_{ref}$ and $T_{sub}$.

These components are constant over the scanned area.

Since $A=wt$, a variable time difference occurs during the scanning cycle, which is given by:

$$\Delta t = \frac{\Delta A}{w} = \frac{B}{w} + \frac{1}{RW} (\Delta y \cos wt - \Delta x \sin wt)$$

If the slope of the signal produced by photomultiplier 32 changes in sign N times per scan, the polarity of the signal at the output of network 142, which tends to follow the sign of the slope at its input, will also reverse N times per scan and the signal at terminal 39 will contain 2N pulses of amplitude "a" and each having a duration given by the above equation. The DC or average value of the signal, obtained at the output 41 of low-pass filter 40, is:

$$V_B = \frac{a}{t_2-t_1} \sum_{t_1}^{t_2} \Delta t \cong 2 \frac{Na}{2\pi} B = 2 \text{ (constant) } B.$$

since the terms $\Delta x \sin wt$ and $\Delta y \cos wt$, which have a zero time-average, do not contribute to the above output. The voltage $V_B$ is entirely analogous to the voltage present at the input of roll amplifier 111 in FIG. 5.

Referring again to FIG. 13, head 36, cooperating with track 38 and amplifier 155, generates a prerecorded timing signal proportional to $dxa/dt = -R \sin A$., which is one of the inputs to synchronous detector 156, the other being $V_5$. Phase-shifter 157 similarly supplies another timing signal proportional to $dya/dt = R \cos A$ to synchronous detector 158. Two low-pass filters, 159 and 160, follow detectors 156 and 158 to furnish signals $V_x$ and $V_y$, proportional to $\Delta x$ and $\Delta y$, available at terminals 42 and 43 respectively. Voltages $V_x$ and $V_y$ are entirely analogous to the voltages appearing at the inputs of amplifiers 112 and 113 of FIG. 5, respectively.

Mathematically, the operations performed by synchronous detectors 156 and 158 and filters 159 and 160 can be described by:

$$V_x = \frac{K}{t_2-t_1}\sum_{t_1}^{t_2} -\Delta t R \sin wt \cong \left(\frac{Na}{2\pi}\right) \Delta x = \text{(constant)} \Delta x$$

and $$V_y = \frac{K}{t_2-t_1}\sum_{t_1}^{t_2} \Delta t R \cos wt \cong \left(\frac{Na}{2\pi}\right) \Delta y = \text{(constant)} \Delta y$$

The waveshape of the timing signals, used as one of the inputs to synchronous detectors 156 and 158, may depart from sinusoidal. In particular, square waves, which permit using simpler circuitry and which provide an increase in the amplitude of $V_x$ and $V_y$, can also be used; the accuracy of $V_x$ and $V_y$ is then somewhat reduced, due to an increase in their relative noise level.

As has been shown, synchronous detection is used to extract two signals proportional respectively to displacement components $\Delta x$ and $\Delta y$. Synchronous detection is not required, in this example, to obtain $V_B$, since, with the circular scan shown in this example, $dA/dt=w$ is a constant. Synchronous detection would, however, be required if w were a function of time, as would be the case, for instance, with an alternating scan.

The signals at terminals 42 and 43 may contain extraneous components due to "noise" or spurious pulses in $V_1$ or $V_2$, such as the pulse shown in $V_1$ from $t=p$ to $t=r$ (FIG. 14). However, as described above, such spurious or "noise" pulses result in $V_5$, in two closely spaced equal pulses of opposite polarity which tend to mutually cancel by averaging in low-pass filters 40, 159 and 160. This form of noise cancellation, which enhances the accuracy of the various output signals, is characteristic of the devices of the invention. It is associated with the use of delay lines 148 and 149 (FIG. 13), or their equivalent, which, in the type of arrangement shown, permits the length of noise pulses in $V_5$ to be limited, and further produces additional inverted noise pulses to oppose the first. As a result of this feature, it is possible to have a surprisingly great amount of mismatch between the incoming scan and the reference scan without materially detracting from the accuracy of the system.

By rectifying $V_5$ and smoothing the resultant pulses, rectifier 161 and low-pass filter 162 furnish a further signal, available at terminal 44, having am amplitude indicative of the degree of dissimilarity, or lack of time-coincidence, between zero-crossings of signals $V_1$ and $V_2$. If the signals were identical, there would be no signal at terminal 44. At the other extreme, if $V_1$ and $V_2$ were totally independent and random, a voltage equal to a/2 would appear at terminal 44. For intermediate degrees of dissimilarity, smaller voltages, depending upon the degree of mismatch of $V_1$ and $V_2$, are generated. The signal at terminal 44 is thus useful to indicate changes occurring in the subject image that may not be due to relative motion. For example, the entry into the field of view of a new object causes an immediate increase of the signal at terminal 44 and its position in the field of view is indicated by pulses such as $p-q$ and $r-s$ in $V_5$. Conversely, the absence of a large voltage at terminal 44 indicates that signals $V_1$ and $V_2$ match one another closely, and that the subject scanned at time $T_{ref}$ is comparable with or the same as, the one scanned at time $T_{sub}$. This characteristic of the system is useful in pattern recognition applications. Alternately, pattern comparison can also be performed simultaneously, rather than sequentially, by using two (or more) synchronized scanners to scan the two patterns and generate $V_1$ and $V_2$, thus further eliminating the need to record and replay the reference signal $V_2$. This mode of operation is entirely analogous with that by which the aircraft sight scanner of FIG. 2, for example, cooperates with the scanner of FIG. 1.

In order for the signal at terminal 44 (FIG. 13) to reflect primarily differences in the patterns having given rise to signals $V_1$ and $V_2$, it is clearly desirable to first eliminate differences in relative position (and in size as will be described in detail below) of the images by nulling the respective signals appearing at terminals 41, 42 and 43. This may be achieved, for example, by manually repositioning one or the other pattern, or automatically by means of conventional servo drives using the signals to be nulled as inputs.

There are also numerous pattern-matching applications in metrology in which it is necessary to measure accurately the location of certain preselected patterns among other patterns, or with reference to a coordinate system or structure; such measurements can be achieved with great accuracy by using the device of the invention and the procedure just described. One example of such an application is the precise location of corresponding image portions in overlapping stereo photographs, as is done in aerotriangulation. In this application, a selected image portion of a first photograph may be scanned to produce a recorded reference that is later correlated with signals obtained from the corresponding portion of a second photograph.

In another application, a workpiece onto which one or more operations are to be performed at precisely defined locations, may be positioned with great accuracy by matching patterns on the workpiece with prerecorded reference signals.

Those versed in the art will recognize that many modifications may be made to the construction of the device described above without departing from the spirit of the invention. For example, noncircular scanning patterns may be used and may be preferable in certain applications. For example, expanding or contracting spiral scans are useful in applications involving substantial progressive changes in image size, as may result from diminishing or increasing distance between the device of the invention and its subject. Alternately, in such applications, the field angle may be changed by progressively varying the focal length of a "zoom"-type objective lens to create a spiral scan at the subject, rather than in the image plane. The rate at which the field angle is made to change may be automatically controlled by the system itself to compensate for such distance changes, so as to maintain the signal appearing at terminal 44 (FIG. 13) at or near its minimum value, and means that can be added to the arrangement of FIG. 13 to obtain such automatic control are shown in FIG. 15. Thus, a low-frequency AC generator 163 feeds one input of DC differential servoamplifier 164, causing DC motor 165 to rotate alternately by a small amount in each direction. Focal length control ring-gear 166 of zoom objective 20a, coupled to the motor pinion 167, therefore undergoes a similar alternating motion, causing the objective focal length, and hence the field angle and the size of the image projected upon faceplate 21a, to periodically change by a relatively small amount, or to "dither." The frequency of such dither may be about 2 Hz.

Tf the area scanned at $T_{sub}$ is generally the same as that scanned at $T_{ref}$, but differs in size by a small amount, the "dissimilarity" signal at output terminal 44a of block 168, which represents the electronic components shown in detail by FIG. 13 that are necessary to produce such a dissimilarity signal, contains an AC component at dither frequency, and this component is either in phase, or in phase-opposition with the output of generator 163, depending on which scanned area is larger. Therefore, at the output of synchronous detector 169, there is a DC signal which is averaged by low-pass filter 170, and applied to the second input of servoamplifier 164, causing motor 165 to rotate predominantly in the direction required to effect perfect match of the areas and to rebalance the servoloop.

While the construction described above operates by varying the focal length of the objective 20a in proportion with the distance to the subject, alternatively the radial position of the scanning aperture 23a may be set at a small radius for a distant subject, and the radius increased as the subject approaches, or vice versa. It may then be advisable to maintain the angular size of the aperture and to provide it with light-control means, such as a graded neutral density filter, having a higher light transmission near the center and a lower transmission near the edge of faceplate 21a. This will maintain an essentially constant light transmission through the system, regardless of the linear changes in the dimensions of aperture 23a. Such a filter may also be useful with fixed apertures in increasing tolerable size changes. It is also possible to combine the two methods, as shown hereinbelow, to vastly increase the adjustment range of the device.

In the embodiment of the structure illustrated diagrammatically in the exploded view of FIG. 16, there is located in front of the scanning disc 340 having a radially elongated aperture 349 a masking disc 347 formed with a helical slot 348. During operation, the masking disc 347 rotates with the adjacent scanning disc 340, except for a slight oscillatory movement or dither, with respect to the scanning disc, as explained above in relation to FIG. 15. The slot 349 of the scanning disc 340 extends across the slot 348 of the masking disc 347. Therefore, depending upon the angular position of the masking disc 347 with respect to the scanning disc 340, a portion of the slot 349 which is nearer to or more distant from the optical axis will receive the light which is transmitted to the photomultiplier.

It can be appreciated that if the scanner for example approaches a target, the target image tends to grow and therefore objects "seen" in one scan may later move out beyond the circle of scan. This can be avoided if either the focal length of "zoom" lens 335 is reduced, or if the disc 347 is turned in the proper direction with respect to the scanning disc 340 so that the portion of the slot 349 which is covered by the slot 348 is at a greater distance from the optical axis. This increases the diameter of the circle of scan in the exact degree the image size is increased as the system approaches the target. The zoom lens 335 will of course only operate within certain limits, and the same is true of the masking disc 347. However, when both of these devices are combined into the same structure and driven together as shown, one of the devices augments the limits of operation of the other device and in this way the range over which the system can, for example, keep within the field of view certain objects in an earlier scanned area is greatly increased. Clearly, the same arrangement also permits elimination of size differences in matching patterns. In FIG. 16, servo motor 343A is analogous to the motor 165 of FIG. 15, and may hence be driven in similar fashion by the output of amplifier 164. While in FIG. 16, disc 340 is driven directly by motor 341, mask 347 is driven through differential 445 and undergoes additional angular motions as imparted by motor 343A through reducing gear box 343B and differential 445. A potentiometer or other angular pickoff device may be driven by motor 343A to furnish a remote, relative or absolute indication of subject size or difference.

In applications involving pattern recognition, it is often desirable to use a plurality of recorded references $V_2$, each corresponding, for example, to a different aspect of a pattern to be recognized. For this purpose, there may be provided a multiplicity of magnetic heads (not shown), rather than just one head 35 (FIG. 11), a corresponding number of recorded tracks, such as track 37 on housing 22, and a corresponding number of the electronic components such as those shown on FIG. 13, to permit a simultaneous comparison of the signal produced by flip-flop 143 with all the recorded references.

Referring again to FIGS. 13 and 14, it will be noted that signal $V_5$ is proportional to:

$V_2V_1-V_1V_2'$, where $V_1'$ and $V_2'$ are the delayed counterparts of $V_1$ and $V_2$. An identical $V_5$ can therefore also be produced at terminal 39a by two 4-quadrant multipliers 171, 172 and amplifier 173 (FIG. 17) instead of amplifiers 151 and 152, and rectifiers 153 and 154, as shown on FIG. 13.

The combined outputs of multipliers 171 and 172, added in resistors 174, 175 and filtered by low-pass filter 176, appear at terminal 45 as a signal having an average amplitude indicative of the degree of match, or correlation level, between $V_1$ and $V_2$. The latter signal is a "match" signal and therefore useful in the same general manner as the "mismatch" signal available at terminal 44 (FIG. 13), to indicate whether properly correlated signals are available. However, while the "mismatch" signal increases sharply in the presence of even quite small differences between $V_1$ and $V_2$, the "match" signal is relatively unaffected by such differences, or by small displacements, and decreases substantially only if the differences or displacements are such that only partial correlation between $V_1$ and $V_2$ exists, as can be seen by the correlation level curve of FIG. 7.

Various other types of "match" or "mismatch" signals can readily be obtained by combining in different ways the four available correlator input signals $V_1$, $V_2$, $V_1'$ and $V_2'$. For example, $V_1$ and $V_2$ could be cross-multiplied in a multiplier such as 172 (FIG. 17) to produce a signal that, after averaging or smoothing, would not exhibit the flat-topped characteristic of the correlation-level signal shown graphically in FIG. 7. Conversely, a "mismatch" signal that would not respond to small displacements could clearly be obtained by feeding all four correlator input signals to a bipolar "OR" logic gate, and by inverting the logic gate output.

For some purposes, a noncircular scan may be preferable. A variety of repetitive scan patterns of various shapes can be obtained simply by combining the previously described rotating, radially elongated apertures with fixed apertures or masks located in front or back thereof. For example, a fixed opaque mask having four straight slits 46, 47, 48 and 49, arranged as shown in FIG. 18, provides a square scanned area in conjunction with rotary aperture 23c. The signals derived from track 38 and fed to synchronous detectors 156 and 158 (FIG. 13) should reflect the type of scan pattern selected by being proportional to linear velocity components. In the above example, symmetrical square pulses may be used that are respectively synchronous with the horizontal and vertical linear portions of the scan. Such pulses approximate to a satisfactory degree the discontinuous 1/2 cos wt and 1/cos $^2$[wt $+\pi/2$ ] functions corresponding to the linear velocity components of the scanning aperture in the $x$ and $y$ directions, hence providing approximately constant motion sensitivity throughout the scanned area.

The V/H Sensors

In aerial photograph, it is necessary to know the value of the velocity-to-height ratio (V/H) in order to provide precise image motion compensation, so as to eliminate the blurring resulting from the relative motion of the aircraft with respect to the ground. The tracker of the invention may thus be used for aerial photographic or navigational purposes or the like, by tracking successive areas of the ground, as is shown in FIG. 19. All scans cannot be referred to the same initially recorded scan, and, because of terrain relief and the change of perspective due to a moving vantage point, and also because of geometrical distortions which may result from changes in the relative angle (from "a" to "b") between the system axis and the vertical or from distortions in the lens, the period of time over which successive scans are compared with the initially recorded scan must be limited in accordance with the limit-positions A and B of the system axis. A new recorded reference is obtained periodically after the system axis has been returned to its initial position, initiating a fresh tracking cycle each time this occurs. This is illustrated in FIG. 19; as the aircraft reaches position II, the next tracking cycle is started with the axis of the system reset from terminal position B to initial position A'. This step-and-repeat sequence continues, carried out automatically as long as V/H sensing, or ground tracking, is desired.

FIG. 20 represents schematically and in simplified block diagram form, the ground tracking circuits, which include a scan comparison arrangement entirely analogous to that shown in FIG. 5 and therefore described here only briefly. The output of the photomultiplier 221 is a varying voltage representative of light intensity throughout each scan. This voltage is amplified by photomultiplier amplifier 222, differentiated by capacitor 223 and resistor 224, and applied to bistable multivibrator 225 to be converted to a binary signal. The output of multivibrator 225 consists of the previously described series of constant-amplitude pulses, variable in both width and time position. These pulses, further amplified by record amplifier 227 are applied through record-read switch 229 to the magnetic memory unit 228.

After the initial or reference scan has been stored in the memory unit, switch 229 is automatically transferred to the "Read" position, then feeding the reference signal to the delay sensor unit 230.

The output $V_3$ of the delay sensor, 230, which includes delay lines and balanced modulators, as described in connection with FIG. 5, is applied to synchronous detectors 231 and 232, together with in-phase and in-quadrature reference voltages generated by memory 228 as explained above. Error signals are thereby generated in the V/H-plus-pitch channel, and in the drift/H-plus-roll channel. $V_3$ is also applied to the input of the yaw channel.

An output in any of the three channels, amplified by integrating servoamplifiers 233, 234, and 235, driving respective servo motors 236, 237, and 238, causes a corresponding action in the optical compensating unit 239, which is simultaneously sensed by pickoffs 240, 241, and 242.

The paired diodes inserted in the input lines of integrating amplifiers 233, 234 and 235 instead of the commonly used resistors, provide a desirable nonlinear characteristic. Under steady-state conditions and while little power is needed by motors 236, 237 and 238, only small signals appear at the input of the amplifiers, causing the diodes to function as relatively high-value resistors. Under such conditions, the integrator time-constant is long, the servo bandwidth is low and system stability is high. These factors lead to a very smooth and accurate system operation. If, however, conditions are changing, as in start-up, relatively strong signals appear at the input of the amplifiers and the diodes function as low-value resistors. Integrator time-constant is then short, permitting a much more rapid response of the servos to the changing conditions than would be possible with fixed-value resistors.

A signal indicative of the degree of correlation is also derived from delay sensor 230 and appears on connection 230A. This signal is an indication of the accuracy with which tracking can be effected under the prevailing conditions of terrain contrast, illumination and haze or cloud cover, and may be used to activate cameras external to the V/H sensors or other equipment dependent upon adequate optical input for its correct operation.

The signal on connection 230A further controls the storage in integrating amplifiers 233, 234 and 235 of the instantaneous values of angular velocity in the forward, transverse and vertical directions determined by the V/H sensor. Should the degree of correlation fall below a preestablished minimum acceptable level, then the angular velocity values are not stored snd information previously stored is utilized by the system to keep the optical stabilization in operation.

Means are provided to allow automatic operation of the V/H sensor at any terrain brightness above the threshold. Automatic gain control unit 226 is controlled by the output of photomultiplier amplifier 222 in exactly the same manner as, for example, signal level control 92 (FIG. 5) is controlled by preamplifier 91. The photomultiplier 221, its amplifier 222 and the automatic gain control unit 226 thus constitute a closed electrical servo loop, which tends to stabilize the level of signals applied to the bistable multivibrator 225. As a byproduct, a useful exposure control signal that varies logarithmically with brightness is obtained from the automatic gain control unit 226 for use by cameras and other equipment, if desired.

FIG. 21 represents schematically another embodiment of the device of the invention as an automatic velocity/height sensor, that is as a device to determine automatically and continuously the V/H ratio. The scanner comprises the same elements as the ones shown in FIG. 11, and in particular a motor 34b driving a rotary housing 22b, a faceplate 21b provided with an aperture 23b and an optical train consisting of lenses and mirrors (not shown) which carry the light flux admitted by aperture 23b to a photomultiplier 32b; the scanner is mounted with its axis of rotation generally vertical above an objective lens 20b. Faceplate 21b is coplanar with the image of the ground 270 produced by lens 20b. Lens 20b is supported by guide means (not shown) permitting it to effect a linear translatory motion parallel to faceplate 21b, between lens positions 20b and 20b' under the control of a rotary cam 271 acting on cam follower 272, secured to the barrel of lens 20b. A return spring (not shown) maintains contact between cam 271 and cam follower 272.

Initially, as lens 20b is located in the position shown by solid lines, an annular area 273, shown cross-hatched, is scanned on the ground and the "line-of-sight" which goes from the lens to the center of the area scanned, is along line 274. As the aircraft moves in the direction of the arrow marked L.O.F. (line-of-flight), cam 271 rotates due to the action of a servo drive to be described later, causing a progressive rotation in the orientation of the line-of-sight from line 274 to line 274', so that exactly the same area 273 is continuously scanned throughout the translation of the lens locations from 20b to 20b'.

By way of explanation of the above, the orientation of the system axis, or line-of-sight, corresponding to position 20b' is shown as line 275 which is parallel to line 274'. It should be remembered that the aircraft has also been moving forward in the direction of the arrow designated L.O.F. causing the actual intersect of the ground with the line-of-sight 274 (rotating to 274') to remain fixed, provided that the angular velocity of such rotation is precisely equal to the V/H ratio. In other words, the translation of the objective lens from 20b to 20b' effectively compensates for the forward motion of the aircraft and permits the device to track a fixed area on the ground (subject only to perspective changes that may result from changes in the vantage point), provided its motion satisfies the equation: $V/H=V_{lens}$/Effective Focal Length.

In order to maintain accurate tracking, a closed servo loop is employed, comprising block 276, which represents the electronic components, shown in greater detail by the block diagram of FIG. 13, that are necessary to provide directional signals at terminal 42 of FIG. 13, or its equivalent 42b of FIG. 21. The loop also includes switch 277 and amplifier 278 which provides a low impedance source with respect to resistors 279 and 280, servo amplifier 281, driving motor 282, an electronic integrator having a time constant of up to several minutes and comprising resistor 279, push-pull amplifier 283 and capacitor 284, tachometric generator 285 which furnishes a voltage proportional to its rotational velocity and combining resistors 280, 286 and 287. Motor 282 carries pinion 288 on its output shaft and drives, through idler 289, gear 290 and pinion 291 on the shaft of generator 285. Gear 290 is attached to cam 271 by conventional means (not shown).

The operation of the devices is as follows: The objective lens being at position 20b, switch 144 (FIG. 13) is momentarily actuated to obtain a reference recording, and switch 277 is closed. Displacement of the aircraft in the direction of the L.O.F. arrow initially causes the image projected on faceplate 21b to move in the same direction, causing a signal to appear at terminal 42b. After amplification by amplifiers 278 and 281, this signal drives motor 282 counterclockwise; this, in turn, causes a counterclockwise rotation of cam 271 and of generator 285, the output signal of which is applied to amplifier 281 in a polarity opposed to that of the signal produced by amplifier 278. Simultaneously, the output of amplifier 278 reaches integrator 279, 283, 284, causing capacitor 284 to acquire an electric charge from the phase-inverting output of amplifier 283, and further causing a signal from its noninverting output to pass through resistor 286 into the input of amplifier 281. The input to amplifier 281 thus comprises three signals, namely, a first one that is proportional to the displacement of the image on faceplate 21b with respect to the image position at which the reference recording was obtained, another one that is proportional to the velocity of rotation of generator 285, such velocity being made accurately proportional to the velocity of linear displacement of lens 20b by a suitable selection of the profile of cam 271, and a third signal proportional to the time-integral of the image displacement. Through the use of these three signals, a desirable servo loop characteristic is obtained, which combines the high gain that is necessary for accurate tracking of the motion of the image projected on faceplate 21b which the degree of damping required for stable operation.

After the objective lens reaches final position 20b', tracking of the image must be interrupted and the lens returned to its initial position 20b. During the return motion, switch 277 is opened to prevent any signal appearing at terminal 42b from reaching amplifiers 281 and 283. However, motor 282 continues to rotate at tracking velocity as a result of the voltage still supplied by amplifier 283, which is nearly balanced by the voltage produced by generator 285. After the objective lens reaches position 20b, a new reference recording is obtained and switch 277 is closed to resume image tracking as described above.

In operation, the motion of lens 20b precisely compensates for the displacements of the image on faceplate 21b which would tend to occur as a result of the forward motion of the aircraft, and the velocity of the lens translation is then precisely equal to:

$V_{lens}$=Effective Focal Length $xV/H$. Therefore, the voltage that appears at terminal 292 is itself precisely proportional to the ratio $V/H$, and can be used to provide accurate image motion compensation in cameras or other equipment.

Under ususal flight conditions, side-wind components acting on the aircraft cause a relatively slow lateral motion, called "drift," which results in an image displacement in the direction perpendicular to that compensated by the lens displacement shown in FIG. 21. The block diagram of FIG. 13 illustrates an arrangement for producing a signal at terminal 43 as a result of such lateral motion. It is therefore a simple matter to equip a V/H sensor, such as shown in FIG. 21, with a separate lateral tracking loop to measure the ratio of drift-velocity to altitude, should this be desired. A servo loop generally similar to the one shown in FIG. 21, but arranged to provide a normally much slower and independent lateral motion of lens 20b could be provided, if necessary.

It is also possible for the device of the invention to measure and to compensate for the effect of aircraft rotations about a vertical axis, known as "yaw" that occur during tracking. For this purpose, the signal at terminal 41 (FIG. 13) would be used as an input to yet another servo drive arranged to rotate, for example, the entire system in opposite to yaw. However experience has shown that this is not generally required.

Since it is entirely analogous to image motion compensation in aerial cameras, for which several known arrangements can be used, compensation of image displacements resulting from aircraft motion can also be obtained in the devices of the invention with a variety of other known optical arrangements. For example, two (or more) servo-controlled linearly movable mirrors located between the lens and the scanner, or at least one pivoted mirror placed in front of the lens, or a swinging mount supported the entire system, can be used without departing from the spirit of the invention.

Where low values of V/H are considered, optical compensation is readily obtained, for example, by translating the lens perpendicularly to the optical axis in two mutually perpendicular directions to compensate for forward and lateral image motions (including the effect of pitch and roll), if necessary, yaw may be eliminated from the system by a rotation of the scanner about the optical axis. There are many drives that are capable of furnishing the two lens translations; for example, a double lead-screw drive provides high accuracy. The speed reduction afforded by the lead screws is well suited to a precise determination by electrical pickoffs of the displacements imparted to the lens. Either tachometer generators for analog velocity outputs, or digital position encoders, for digital readout, may be used as pickoffs.

The usefulness of a lead-screw drive, however, is limited to low values of V/H (less than 1 radian per second) by the requirement that the lens support mechanism be returned to its initial position in a relatively short time. When this becomes an appreciable fraction of the total time, accuracy losses due to intermittent sensing tend to occur. To provide for a considerably faster return, or retrace, optical compensation may be provided by a swinging mirror, as shown in FIG. 22. Flight direction is normally parallel to the optical axis of the scanner. Compensation for forward velocity and pitch is obtained by rotation of the mirror 210 around its axis at an angular velocity equal to half of the V/H value. Compensation of lateral velocity and roll is effected by a rotation of the entire scanner and mirror assembly around the scanner axis, while yaw compensation is obtained by a similar rotation of the scanner only, not including swinging the mirror.

Referring to FIG. 22, it will be seen that the scanner is supported for rotary movement about the optical axis by the support 199'. A gear 212 is fixed coaxially to the scanner and meshes with the gear 211 driven by the yaw servo drive and pickoff 199 which is carried by the framework supported for rotary movement by the support 199'. This entire framework carries a gear 215 meshing with pinion 214 driven by lateral V/H and roll servo drive and pickoff 213.

The light reaches the objective 193 after being reflected from a tiltable mirror 210 fixed to a pin 194 which is supported for pivotal movement about an axis normal to the optical axis. A lever 195 is fixed to the pin 194 and carries a cam follower roller which engages a cam 197, and a spring 196 urges the lever 195 and the mirror 210 to turn in a direction which maintains the cam follower in engagement with the cam. This cam 197 is turned by the V/H and pitch servo drive and pickoff 198. The drives 198, 199, and 213 operate automatically to stabilize the image received by the scanner in the manner explained above.

Compensation by a swinging mirror is limited to relatively small angles by geometrical distortions proportional to the cosine of the angle of the reflected optical axis with respect to its central position For that reason the amplitude of oscillation of the mirror must be restricted to 5° or 10°.

Should the V/H sensor be utilized to control a camera having substantially the same orientation, the optical stabilization components of the V/H sensor could advantageously extended mechanically or optically to simultaneously perform the same function for the camera, and be physically located within the camera structure. A high degree of I.M.C. accuracy is thus provided, while the need for pickoffs and associated servos is eliminated. In this type of operation, the optical stabilization system functionally replaces a stabilized platform. FIG. 23 illustrates a camera, adapted for use aboard a satellite, in which the I.M.C. function is mechanically coupled with that of an integral V/H sensor 260 according to the invention, for fully automatic operation.

The satellite is subject to five distinct motions relative to the earth or other heavenly body it is orbiting: Two rotations occur about the center of the earth and are, respectively, the orbiting motion and the relative displacement perpendicular to the plane of the orbit produced by heavenly body rotation, if any. Because the radius of the heavenly body is generally very large in respect to the important dimensions of the field of view, these two motions can be considered as translations for photographic purposes. In addition, the satellite undergoes three oscillatory motions about its own center of gravity, namely pitch, roll and yaw.

It left uncompensated, any and all of these motions would tend to cause excessive image degradation through motion blur. While it is customary in aerial photography to eliminate the effects of pitch, roll and yaw by gyro stabilization of the camera, in view of the comparatively small amplitude and low frequency of a satellite's oscillations, it is possible for example for the V/H sensor to sense the combined effect of forward velocity and pitch, compensating for it by motions of lenses 261 and 262, thereby obviating gyroscopic pitch stabilization.

Lateral image velocity is eliminated by actuator 257 which orients the camera 255 (and the V/H sensor it carries) around pivots 258 and 257B in the direction of average ground track; roll is detected optically by tracking stars and compensated for by camera rotation around pivot 258 by the effect of actuator 256 (while actuator 257 pivots at its attachment point 257C).

Taking advantage of the excellent yaw sensitivity of the V/H sensor according to the invention yaw signals are also fed to actuator 257 to change camera orientation, as explained above, so as to compensate for yaw oscillations.

The resultant system, compared to the conventional gyroscopically controlled, servo-actuated type, is substantially simpler because the camera need only be supported inside the satellite in a manner to provide two independent compensating rotations about the yaw and roll axes, optical stabilization being provided about the pitch axis and in the forward direction.

As seen in FIG. 23, the camera is a complete and integrated means, it is also possible to simply present these errors on meters for navigational purposes, for example, or to record them on strip-chart recorders so that the errors may be graphically presented and later assessed.

While the scanning is shown above as being produced by mechanical means, it is evident that a similarly useful result can be produced statically by electrical means. For example, an image-converter tube can be used in which a beam of electrons, which is deflected, or steered as required by electrostatic or electromagnetic means, scans or generates an image which is analyzed or "dissected."

It should be noted in connection with the scanning arrangements described above and shown in the drawings, that it is also possible to project onto the target a beam in the form of a relatively thin sheet of rays, which will be reflected back from the target to be received by the system of the invention, the system being selectively sensitive to the energy in such rays. For example, the sweep indicated in FIG. 1 may be produced by projection from some source of energy, such as an optical maser, which provides a beam capable of being reflected back, the beam rotating at a constant speed so as to describe substantially a hollow cone whose base is at the target. Of course, with such an arrangement, in some cases, a slotted scanning disc or its equivalent may be unnecessary at the detector and, instead, the system may simply detect all radiation received by reflection from the package mounted in the vehicle by its vertical axis pivots, while yaw and roll servo actuators, anchored to the vehicle frame by pivots 257C and 256C, control its position.

The system of the invention, which may thus form the nucleus of a satellite control system, further has the capability of recognizing and of tracking a pattern of preselected celestial bodies to determine or control the attitude of the satellite, particularly in roll, but also in yaw and pitch.

Where the optical compensation of the V/H sensor is simultaneously utilized for camera I.M.C. purposes, camera recycling should generally occur simultaneously with V/H sensor retrace. For that purpose, a pulse may be generated by the V/H sensor at the beginning of the retrace to initiate camera cycling.

Where a camera is used in combination with the system of the invention, it is clearly not essential to always provide a direct mechanical connection between the camera and the system. Instead, pickoffs may be used to remotely control a camera which is entirely separate from the system of the invention. Such controls may be used not only for I.M.C. and for orientation of the camera, but also to control exposure, as shown above, and the transporting of the film of the camera.

While, in photographic applications, the errors which are detected are used for controlling torquers or other actuating rotary wedge which has been projected onto the target area.

Beside those shown in FIGS. 1, 2, 3 and 11, there are many different arrangements capable of transmitting to the photodetector the light-flux projected by the lens and passing through the scanning aperture of the scanner of the invention. FIG. 24 represents an embodiment in which a shaped fiber optics bundle 295 performs the above-mentioned light-ducting function.

The scanner drive-motor 34d is equipped with a tubular shaft 33d through which the light-flux projected by lens 20d and passing through scanning aperture 23d is guided. The guiding is achieved by means of bundle 295, which extends from the scanning aperture (formed by the bundle itself or by a separate aperture member) to the proximity of the photocathode 31d of photomultiplier 32d. The bundle is secured to the rotary housing 22d by a cement 296, which may fill all unused space in the frontal cavity of housing 22d. The outside surface of housing 22d may further carry magnetic tracks such as 37d and 38d, which cooperate with magnetic heads (not shown) in the manner described above.

The arrangement just described transmits light very efficiently, yet is mechanically and optically simple and inexpensive.

In the system of the invention, directional, or error, signals are obtained from steady or cyclic variations in the average amplitude of the correlation signals resulting from changes in relative position of images. Thus, the changes in position which may be allowed must remain within such limits that sufficient correlation is maintained. In certain applications, it may be desirable to allow for momentary changes in position in excess of the normal limits of the system. Where the accuracy is equally important, it is possible to combine, that is to use simultaneously, two or more systems of the invention, one of them being designed to accept wider limits, while at least one other is designed to produce high accuracy, but is limited to operation within narrower limits. The directional, or error signals produced by the systems are then combined and sent to the proper mount torquers, output meters, or any other device, as may be desired.

The limits of motion over which the system of the invention can operate properly are determined by factors such as the focal length of the lens, which, together with the dimensions of the scanning aperture determine the optical field angle, the frequency response of the video portion of the circuit, the amount of time-delay introduced by circuits such as 102 and 103 (FIG. 5) as well as the overall signal-to-noise ratio, which depends mostly on the quality of the image being scanned.

To combine wider operating limits with the accuracy of a narrow-limit system, it will however not always be necessary to duplicate the optical parts of the system, or the mechanical scanner elements, or all of the electronic circuitry following the photomultiplier up to an including the torquer amplifiers. In many cases, it will be possible to utilize a single scanner and a single photomultiplier, and to send the video signals to two separate electronic processing units, one being designed for narrow limits, and therefore high accuracy, while the other is designed for much broader limits, but not for the same degree of accuracy.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a guidance system, in combination, scanning means for scanning a selected area, said scanning means operating cyclically to provide at least one scan having a given video pattern; photosensitive means cooperating with said scanning means for changing each said video pattern into electrical signals which are respectively the analogs of said video patterns; quantizing means cooperating with said photosensitive means for converting the electrical signals produced thereby into binary signals; delay means cooperating with said quantizing means for providing a delayed binary signal; a source of a reference binary signal; delay means for delaying the reference binary signal; a pair of cross-multiplying means cooperating with said source, said quantizing means, and both of said delay means for cross-multiplying a delayed binary signal from said quantizing means with an undelayed binary signal from said source and for cross-multiplying an undelayed binary signal from said quantizing means with a delayed signal from said source; means cooperating with said pair of cross-multiplying means for determining the difference between the pair of cross-multiplications; a second reference source, said latter reference being capable of discriminating, when multiplied with said cross-multiplications, between errors in yaw, pitch, or roll; and means for correcting the position of said scanning means according to the errors determined.

2. A guidance system in accordance with claim 1 including means for differentiating and filtering said electrical signals generated by said photosensitive means to eliminate the DC component and to attenuate the lower frequency components thereof.

3. In a guidance system, in combination, a carrier; a pair of recording tracks carried by said carrier, one of said recording tracks carrying a reference signal; means cooperating with the other of said recording tracks for recording onto the latter an incoming signal and for simultaneously erasing any previously recorded signal from said other track; correlating means cooperating with said incoming signal and said reference signal for correlating said signals to determine when a new reference signal is required; and gating means activated by said correlating means and cooperating with said tracks for retaining an incoming signal on said other track and for starting said erasing and recording on said one track when said correlating means determines the need for a new reference signal, so that said tracks operate alternately to carry a reference signal and to receive incoming signals.

4. A guidance system in accordance with claim 3 including additional ones of said recording tracks for receiving thereon correspondingly additional ones of said reference signals.

5. Apparatus for detecting changes occuring in an image formed by a pattern of radiant energy in which image components are displayed in contrasting energy levels, said apparatus comprising:

A. means including a transducer responsive to said radiant energy to scan a predetermined section of said image during a first period to produce a first electrical signal which is a substantially uninterrupted voltage analog representative of said scanned section in said period and to scan said section during a later period to produce a second electrical signal which is a substantially uninterrupted voltage analog representative of said scanned section in the later period, B. means recording the first signal during the first period and to play back said recording during the later period to provide a reference signal, and C. means to measure the degree of correlation between the reference signal and the second signal to produce an error signal which is a function of the changes occurring in said section of said image between said periods and which is constituted by error components in three coordinates.

6. Apparatus, as set forth in claim 5, wherein said transducer means includes means responsive to said radiant energy in the form of light.

7. Apparatus, as set forth in claim 5, wherein said transducer means includes means responsive to said radiant energy in nonvisible form.

8. Apparatus, as set forth in claim 5, wherein said correlation measuring means includes means responsive to analog and digital signals.

9. Apparatus, as set forth in claim 5, including means for automatically controlling the field angle at which said scanning means views said image to minimize said error signal.

10. Apparatus, as set forth in claim 5, wherein said transducer includes:

A. an objective for directing an image of a subject onto the focal plane of the objective, B. a rotary disc disposed at said focal plane and having an axis of rotation which at least intersects said image, said disc having an aperture therein spaced from said axis of rotation whereby in the course of rotation an annular section of said image is scanned by said aperture, and C. a radiant-energy sensitive device positioned at the side of the disc opposed to said objective to intercept radiant energy from the scanned annular section and to convert the energy into an electrical signal which is an uninterrupted voltage analog thereof.

11. Apparatus, as set forth in claim 10, wherein said aperture is formed by an elongated radial slot in said disc.

12. Apparatus, as set forth in claim 11, wherein said radial slot has a wedge-shaped configuration.

13. Apparatus, as set forth in claim 11, further including means to adjust the width of said radial slot.

14. Apparatus, as set forth in claim 11, further including a masking disc coaxial with said scanning disc and rotatable therewith, said masking disc being formed with a helical slot part of which extends across said radial slot so that by relative angular displacement of said masking and scanning discs, a selected portion of said radial slot will be exposed to pass radiant energy from said objective.

15. Apparatus, as set forth in claim 10, wherein said objective is adjustable and further including means automatically adjusting said objective to maintain the objects represented in the scanned image of substantially the same magnitude during relatively large changes in distance between the subject and said objective.

16. Apparatus, as set forth in claim 14, further including means to adjust the angular relationship between the masking and scanning discs during a change in the distance between a subject and said objective for retaining in the scanned annular section the same objects during a relatively large change in the distance between the subject and the objective.

17. Apparatus for detecting changes occurring in an image formed by a pattern of radiant energy in which image components are displayed in contrasting energy levels, said apparatus comprising:
   A. means including a transducer responsive to said energy to scan a predetermined section of said image during a first period to produce a first electrical signal which is a substantially uninterrupted voltage analog of said scanned section in said period and to scan said section during a later period to produce a second signal which is a substantially uninterrupted voltage analog of said section in the later period,
   B. means to quantize said first and second signals to produce first and second trains of pulses of varying width and spacing which is a function of the analog values of said signals, and
   C. means recording the first train of pulses during said first period and to play back the recording during said second period to provide a reference train of pulses, and
   D. means to measure the degree of correlation between said reference train and said second train to produce a train of error pulses which represents the changes occurring in said section of said image between said periods and which is constituted by error components in three coordinates.

18. In a camera system subject to displacement relative to an area being viewed,
   A. optical means to produce an image of said area, which image changes with said displacement,
   B. means including a photocell to scan a section of said image during a first period to produce a first video signal representative of said section and to scan said section of said image during at least one later period to produce a second video signal representative of said section at the later period,
   C. means to quantize said first and second video signals to produce first and second trains of pulses of varying width and spacing which are a function of said signals,
   D. means recording the first train during said first period and to play back the recording during said second period to provide a reference train of pulses, and
   E. means to compare said reference train and said second train to produce a train of error pulses which represent the extent and direction of the displacement occurring between the first and second periods in three coordinates.

19. In a camera system as set forth in claim 18, further including means responsive to said error train to shift the position of said image to effect image motion compensation.

20. In a camera system, an image motion compensation apparatus comprising:
   A. an optical device producing an image of an area, which image changes with motion of said camera system,
   B. a scanner including a photocell to cyclically scan an annular section of said image to produce during one cycle a first video signal which is an analog of said section as it appears in said cycle, and during a subsequent cycle a second video signal which is an analog of said section as it appears in said subsequent cycle,
   C. means to quantize said first and second signals to produce first and second trains of pulses of varying width and spacing which are a function of said signals,
   D. means operatively coupled to said scanner and including a circular magnetic recording track to record said first train concurrently with the scanning action during said first cycle and to play back the recording during said subsequent cycle to produce a reference train,
   E. a circuit for measuring the degree of correlation between said reference train and said second train to produce a train of error pulses which represent the extent and direction of motion occurring between the two cycles, and
   F. a servomechanism responsive to said error train and coupled to the camera system to effect image motion compensation.

21. A guidance system for guiding a vehicle toward a selected target, said system comprising:
   A. means cyclically scanning an area enclosing said target to produce during a selected cycle a first electrical signal which is a substantially uninterrupted analog voltage representative of the image of said target at that time, and to produce during at least one subsequent cycle a second electrical signal which is a substantially uninterrupted analog voltage representative of the image of said target at a later time,
   B. means recording said first signal during said first cycle and for reproducing said recording during said subsequent cycle to provide a reference signal,
   C. means to measure the degree of correlation between the reference signal and the second electrical signal to produce a control signal having components in pitch, yaw and roll which depend on the shift in position of said target relative to said vehicle in the interval between the first cycle and the subsequent cycle, and
   D. control means disposed in said vehicle and responsive to the components of said control signal to maintain said vehicle oriented towards said target.

22. A guidance system, as set forth in claim 21, further including means to determine the degree of correlation between said reference signal and said second signal to produce an electrical signal dependent thereon, and means actuated by said electrical signal, when a given reference signal no longer affords a given degree of correlation, to create a new reference signal.

23. A guidance system, as set forth in claim 21, further including a gimbal structure for supporting said scanning means and control means responsive to signals derived from said scanning means to maintain said gimbal structure oriented towards said target, and means coacting with said control means to render same temporarily inoperative when there is a loss of signals.

24. A guidance system, as set forth in claim 23, wherein said gimbal structure also carries gyro means, and further including means to render said gyro means operative when said control means is rendered inoperative, said gyro when operative maintaining said scanning means at the orientation it had just prior to said loss of signals.

* * * * *